(12) United States Patent
Varley

(10) Patent No.: US 10,448,577 B2
(45) Date of Patent: Oct. 22, 2019

(54) ROUND BALING APPARATUS

(75) Inventor: Seamus Varley, Dublin (IE)

(73) Assignee: Kverneland Group Ravenna S.R.L., Russi (IT)

( * ) Notice: Subject to any disclaimer, the term of this patent is extended or adjusted under 35 U.S.C. 154(b) by 1442 days.

(21) Appl. No.: 14/235,552

(22) PCT Filed: Jul. 27, 2012

(86) PCT No.: PCT/EP2012/064836
§ 371 (c)(1),
(2), (4) Date: Feb. 6, 2014

(87) PCT Pub. No.: WO2013/014291
PCT Pub. Date: Jan. 31, 2013

(65) Prior Publication Data
US 2014/0165856 A1    Jun. 19, 2014

(30) Foreign Application Priority Data

Jul. 28, 2011    (IE) .................................. S2011/0336

(51) Int. Cl.
*A01F 15/07*    (2006.01)
*A01F 15/08*    (2006.01)

(52) U.S. Cl.
CPC .......... *A01F 15/0705* (2013.01); *A01F 15/08* (2013.01); *A01F 15/0833* (2013.01);
(Continued)

(58) Field of Classification Search
CPC .. A01F 15/0705; A01F 15/0833; A01F 15/08; A01F 15/06; A01F 2015/077;
(Continued)

(56) References Cited

U.S. PATENT DOCUMENTS 2,627,223 A * 2/1953 Berge ...................... A01F 15/07
                                                                   100/13
4,510,861 A * 4/1985 Campbell ........... A01F 15/0705
                                                                   100/88

(Continued)

FOREIGN PATENT DOCUMENTS

EP           2220929 A1 * 8/2010 ........... A01D 89/007
WO    WO 8402253 A1 * 6/1984 ......... A01F 15/0705
WO    WO 9908505 A1 * 2/1999 ......... A01F 15/0705

OTHER PUBLICATIONS

International Preliminary Report on Patentability pertaining to Application No. PCT/EP2012/064836 filed Jul. 27, 2012.

*Primary Examiner* — Gregory D Swiatocha
(74) *Attorney, Agent, or Firm* — Dinsmore & Shohl LLP

(57) ABSTRACT

A round bale forming apparatus which includes a first bale forming chamber and a second bale forming chamber the second bale forming chamber being positioned rearwardly of the first bale forming chamber; each of the first and second bale forming chambers has components for forming a bale from a crop product; a feeding mechanism which feeds the crop product into the bale forming apparatus in order to form a bale from the crop product; a transfer mechanism for transferring a partially formed bale from the first bale forming chamber into the second bale forming chamber; and a directional mechanism for directing the crop product from the feeding mechanism into the first bale forming chamber or the second bale forming chamber such that a partially formed bale is formable in the first bale forming chamber and a fully formed bale is formable in the second bale forming chamber.

20 Claims, 30 Drawing Sheets

(52) U.S. Cl.
CPC ... *A01F 2015/077* (2013.01); *A01F 2015/078* (2013.01); *A01F 2015/0775* (2013.01)

(58) Field of Classification Search
CPC ........ A01F 2015/078; A01F 2015/0775; A01F 2015/0795
See application file for complete search history.

(56) References Cited

U.S. PATENT DOCUMENTS

| | | | | |
|---|---|---|---|---|
| 4,517,891 | A | * | 5/1985 | Henry ................. A01F 15/0705 100/88 |
| 2002/0073678 | A1 | * | 6/2002 | Lucand .................. A01F 15/07 56/341 |
| 2011/0174171 | A1 | * | 7/2011 | Viaud ................. A01F 15/0705 100/76 |

* cited by examiner

ROUND BALING APPARATUS

The present invention relates to agricultural harvesting machinery in particular to round balers which are used to form round bales of compressed hay or grass materials.

It is well known to form bales from crop products such as hay, grasses, cereal crops or cotton. It is to be understood that the terms crop products, hay or grass are used interchangeably throughout the specification to describe suitable materials used for forming bales that are found on agricultural land when cotton, cereal crops or grasses are cut.

In practice, when baling, the hay or grass products are cut and then collected by means of a pick up device into a baling chamber. The collected hay or grass is subjected to a winding action within the baling chamber by means of positively driven belts or rollers. The cut hay or grass is wound around itself to form the bale whilst in the chamber. Once the bale has reached a specified size and density the bale is bound with a mesh and discharged from the chamber on to the ground. Optionally the bale is wrapped in a suitable plastics material to further protect the integrity of the bale from external atmospheric forces. It is well known that during the operation of collecting, bale forming and discharging the bale that the baling apparatus is stationary whilst the fully formed bale is being wrapped and discharged from the baling apparatus.

A number of prior art documents purport to solve this problem by forming the bale in such a manner as to continue the forward progress of the baling apparatus whilst a final formed bale is being discharged from the baling apparatus.

WO 84/02253 discloses a dual fixed chamber round baler. This apparatus has a first small or partial bale forming chamber and a second large or complete bale forming chamber. The first and second chambers are positioned in a linear arrangement. Each chamber has a plurality of rollers arranged around the internal perimeter of the respective chambers. The first and second chambers are alternately joined and divided by vertically tilted upper and lower chamber dividing roller units. In use, the dividing roller units are raised and lowered to allow the partially formed bale move from the first chamber to the second chamber.

U.S. Pat. No. 4,625,502 discloses a round bale press having two chambers, a front bale core forming chamber and a main full sized bale forming chamber. The bale core is formed in the front bale core forming chamber whilst a main bale is tied and discharged from the main full sized bale forming chamber.

EP 0 064 117 discloses a round bale press having two chambers, a front chamber in which the bale is formed by subjecting the cut crops to a winding action under the effect of positively driven belts and a binding chamber. In use, the bale is fully formed in the front chamber and then transferred to the binding chamber by means of a transfer mechanism, which is disposed between the front chamber and the binding chamber. The transfer mechanism comprises rollers which extend transversely with respect to direction of travel of the press and which are distributed about a common transverse axis of rotation. The space between two adjacent rollers is such that it allows a formed bale to seat in between two adjacent rollers so that it can be moved from the front chamber to the binding chamber during rotary displacement of the rollers.

EP 2 281 437 discloses a round baler comprising a feeder having several outlets which feed various chambers within the chassis of the baler. The baler comprises a main bale chamber and an auxiliary bale chamber. The bales are formed in the main bale chamber and then tied or wrapped and ejected from the auxiliary bale chamber.

The above prior art baler have continuous bale forming means. However, the problems associated with the devices is that they are complicated large mechanisms which have difficulty in achieving their purpose. There are difficulties associated with limitations in bale sizing, complexity of design and uncertainty in bale transfer between the chambers.

It is therefore an object of the present invention to provide a round bale forming apparatus which ensures the efficiency of the transfer of the bale from one chamber to another thereby improving the efficiency of continuously forming a round bale.

It is acknowledged that the term 'comprise' may, under varying jurisdictions be provided with either an exclusive or inclusive meaning. For the purpose of this specification, the term comprise shall have an inclusive meaning that it should be taken to mean an inclusion of not only the listed components it directly references, but also other non-specified components. Accordingly, the term 'comprise' is to be attributed with as broad an interpretation as possible within any given jurisdiction and this rationale should also be used when the terms 'comprised' and/or 'comprising' are used.

Further aspects of the present invention will become apparent from the following description which is given by way of example only.

According to the invention, there is provided a round bale forming apparatus comprising a first bale forming chamber and a second bale forming chamber, the second bale forming chamber being positioned rearwardly of the first bale forming chamber;

each of the first and second bale forming chambers comprising means for forming a bale from a crop product;

a feeding mechanism which feeds the crop product into the bale forming apparatus in order to form a bale from the crop product;

transfer means for transferring a partially formed bale from the first bale forming chamber into the second bale forming chamber; and directional means for directing the crop product from the feeding mechanism into the first bale forming chamber or the second bale forming chamber such that a partially formed bale is formable in the first bale forming chamber and a fully formed bale is formable in the second bale forming chamber.

Preferably, the directional means is adapted to direct the crop product from the feeding mechanism into one of the first bale forming chamber and the second bale forming chamber such that a partially formed bale is formable in the first bale forming chamber and a fully formed bale is formable in the second bale forming chamber.

The directional means adapted to direct the crop product from the feeding mechanism into the one of the first bale forming chamber and the second bale forming chamber has the advantage that the directional means directs the crop product firstly into the first bale forming chamber and then subsequently into the second bale forming chamber. This arrangement has significant advantages over the prior art apparatus in which crop product is directed into the second bale forming chamber via the first bale forming chamber. Thus in the prior art, the pathway for the crop product feed to the second bale forming chamber is through the first bale forming chamber. However, in the present invention, the directional means is adapted to directly feed crop product from the feeding mechanism to the second bale forming chamber. This allows for the desired bale density to be achieved in a more efficient manner.

The directional means may comprise a plate or alternatively, the directional means may comprise a roller or plurality of rollers.

Further features of the present invention are included in the appended claims and are described hereinbelow.

The advantage of the present invention is that the baling process is more efficient. It is no longer necessary to stop collecting the cut grass or hay whilst discharging a completed wrapped bale from the baling apparatus. Furthermore the apparatus of the present invention reliably transfers the partially formed bale from the first chamber to the second completion chamber with relative ease. This ensures that baling process is continuous and more efficient than those apparatuses that are currently available. A significant advantage of the apparatus of the present invention is that crop product is carried in a pathway through the apparatus by positive force, including feeding of crop product into the apparatus and subsequent transfer of a partially formed bale from the first bale forming chamber to the second bale forming chamber.

In the round bale forming apparatus of the present invention, each of the first and second bale forming chambers comprises a bale forming system such as a fixed chamber roller system baling apparatus or a variable diameter belt system baling apparatus.

Thus, in one embodiment of the invention, each of the first and second bale forming chambers comprises a bale forming system such as a fixed chamber roller system baling apparatus or a variable diameter belt system baling apparatus. It is understood that the fixed chamber roller system has a plurality of separate endless rollers or conveyor units with transverse bars arranged across the width of the chassis of the baling apparatus and surrounding the inner peripheral surface of the first and second bale forming chambers. The fixed chamber roller system forms bales of fixed diameter. It is understood that the variable diameter belt system has one or more endless belts arranged across the width of the chassis of the baling apparatus and surrounding the inner peripheral surface of the first and second bale forming chambers. The endless belts form a cavity which increases as the bale is being formed. In use, the belt is tensioned at the outset. Various suitable components such as, for example, springs, moveable rollers and/or hydraulic mechanisms are used to retain tension on the belt, which allows the belt to take up or let out as required which in turn, enables the belt to adapt to the shape of the bale as it is being formed. The variable diameter belt system is known to form bales of variable diameter.

In a further embodiment of the invention it is possible to combine a fixed chamber roller system with a variable diameter belt system in the baling apparatus wherein the first bale forming chamber comprises the type of bale forming system known as a variable diameter belt system and the second bale forming chamber comprises the type of bale forming system known as a fixed chamber roller system.

Preferably, the transfer means comprises the force of gravity due to a height differential between a point of exit from the first bale forming chamber and a point of entry to the second bale forming chamber.

Preferably, the first bale forming chamber is located such that the central longitudinal plane through the first bale forming chamber is positioned at a higher level than the central longitudinal plane through the second bale forming chamber, whereby the base first bale forming chamber is provided at a level at least just higher than the base of the second bale forming chamber to facilitate transfer of the partially formed bale from the first bale forming chamber to the second bale forming chamber.

Most preferably, at least a portion of the base of the first bale forming chamber is at a higher level than at least a portion of the base of the second bale forming chamber.

Preferably, the transfer means comprises a transfer mechanism. The transfer mechanism may comprise a conveyor belt which is provided at an angle to the horizontal, inclined in the direction of the second bale forming chamber, so as to transfer the bale effectively into the second bale forming chamber.

Most preferably, the transfer means comprises the transfer mechanism in addition to relying on the force of gravity provided by the height differential between the first bale forming chamber and the second bale forming chamber.

Providing such a transfer means has the advantage that the transfer means moves the primary bale with positive forces including gravity because of the height differential between the first bale forming chamber and the second bale forming chamber. The height differential has the effect that, during transfer from the first bale forming chamber, the partially formed bale is falling from a height; even a small height difference between the first bale forming chamber and the second bale forming chamber provides an advantage in transferring the bale from the first bale forming chamber to the second bale forming chamber, as the bale of large mass is falling in a downwardly and generally rearwardly direction. This height differential is especially important where the apparatus is being operated on an incline especially a steep incline such as when the bale forming apparatus is being operated in a hilly field. This use of the force of gravity for effective bale transfer is in addition to the transfer mechanism which is also preferably provided.

The transfer mechanism may comprise any one of the following: conveyor belt or conveyor type movement means; rollers lifting and pushing the bale; chamber door rotating and pushing; and belts and disc type mechanism adapted for pushing and forcing bale transfer from the first bale forming chamber into the second bale forming chamber.

In a preferred embodiment, the transfer mechanism includes a conveyor belt and preferably, the conveyor belt is provided at an angle inclined towards the second bale forming chamber.

In one embodiment of the invention, the transfer mechanism for transferring a partially formed bale from the first bale forming chamber into the second bale forming chamber comprises a conveyor arranged around a plurality of rollers.

The term, "conveyor" should be understood as a general term to describe continuous movement of a surface by a chain, band or similar revolving around one or more shafts. It is also to be understood that the conveyor could be any one of a tangential, radial or axial conveyor acting continuously.

The term, "crop product" includes any crop product desired to be formed into a bale including but not limited to grass, hay, cereal crops, cotton.

In one embodiment of the invention, the transfer mechanism for transferring a partially formed bale from the first bale forming chamber into the second bale forming chamber comprises a comprises a belt arranged around a plurality of rollers. Optionally, the plurality of rollers are connected to each other by connecting means.

Advantageously, the connecting means is connected to a drive mechanism which is operable to move the position of some of the rollers in the plurality of rollers relative to one specific roller of the plurality of rollers.

Ideally, the transfer means for transferring a partially formed bale from the first bale forming chamber to the second bale forming chamber, is connected to the directional means and operable to alter the pathway of the crop product being fed into the round table forming apparatus such that when the partially formed bale in the first bale forming chamber reaches a pre-determined diameter and/or density and is transferred to the second bale forming chamber, the pathway of the crop product incoming into the round bale forming apparatus is directed into the second bale forming chamber.

In one preferred arrangement, the transfer mechanism forms at least part of the base of the first bale forming chamber.

Advantageously, the first bale forming chamber and the second bale forming chamber are located adjacent to each other, with the transfer mechanism being provided between the first bale forming chamber and the second bale forming chamber; optionally the transfer mechanism being provided in the region in which the first bale forming chamber meets the second bale forming chamber. The transfer mechanism in this location has a number of advantages including positive force being applied to the partially formed bale and any loose crop product during the transfer from the first chamber to the second chamber. Also in this arrangement, the transfer mechanism extends beyond the feeding means i.e. the transfer mechanism extends beyond the rotor of the feeding means.

The cutting and/or feeding means is preferably located in a region between the first bale forming chamber and the second bale forming chamber. In this preferred arrangement, the pathway for the partially formed bale is free from possible obstruction which would otherwise be caused by the rotor.

Preferably, the transfer mechanism comprises any one or more of the following group: belt; rotating disc; rollers for pushing the bale. The transfer mechanism may also comprise a pivotably moveable chamber door provided on the first bale forming chamber. The pivotably moveable chamber door can also function as the urging means which is referred to hereinbelow.

Ideally, the first bale forming chamber is conveniently provided with a door moveable between an open position and a closed position such that in the open position, the bale in the first bale forming chamber can move from the first bale forming chamber to the second bale forming chamber Ideally, the door of the first bale forming chamber is moveably connected to the drive mechanism which operates the transfer mechanism whereby when the door of the first bale forming apparatus opens, a partially formed bale exits from the first bale forming chamber.

Advantageously, the round bale forming apparatus comprises urging means for urging the bale from the first bale forming chamber to the second bale forming chamber such that frictional forces between the bale and the side walls of the first bale forming chamber are substantially overcome and said frictional forces do not impede the transfer of the bale from the first bale forming chamber to the second bale forming chamber.

The urging means for urging the bale from the first bale forming chamber to the second bale forming chamber is adapted such that frictional forces between the bale and the side walls of the first bale forming chamber are substantially overcome may be included in the transfer mechanism.

Optionally, the urging means comprises means for reducing the surface area of the side walls of the first bale forming chamber that is in contact with the bale in the first bale forming chamber.

The means for reducing the surface area of the side walls of the first bale forming chamber that is in contact with the bale in the first bale forming chamber may comprise the door on the first bale forming chamber, the door being formed such that the side walls of the door provide a substantial portion of the side walls of the first bale forming chamber; and the door being moveable between an open position and a closed position such that in the open position, the bale in the first bale forming chamber can move from the first bale forming chamber to the second bale forming chamber without being in contact with the full surface area of the side walls of the first bale forming chamber.

Advantageously, the door on the first bale forming chamber is pivotably moveable between the closed position and the open position.

Conveniently, when the chamber door is in the open position and the bale in the first bale forming chamber is moving from the first bale forming chamber to the second bale forming chamber without being in contact with the full surface area of the side walls of the first bale forming chamber, a guide wall portion is provided to guide the bale to the second bale forming chamber.

In one embodiment, such as for the fixed chamber type baling apparatus, the door of the first bale forming chamber is provided in two part, namely a first door part and a second door part with the first part being moveable between the open position and the closed position; and the second door part being fixed in place such that the second door part functions to provide a guide wall for the bale as it is transferred from the first bale forming chamber to the second bale forming chamber. Optionally, the first door part and the second door part may be defined by a longitudinal cut along the opposed side walls of the door. Advantageously, the longitudinal cut may be set at an angle.

This arrangement has the advantage that it addresses the problem of frictional forces between the bale and the chamber side walls in that, when the door is opened to release a partially formed bale from the first bale forming apparatus, a large surface area of the side walls is lifted upwardly out of the way of the bale so that the frictional forces between the rotating bale and the side walls of the chamber door which form the side walls of the first bale forming chamber, is substantially reduced since only the lower part of the side walls remains in place and this lower part functions as a guide wall to guide the travel path of the bale to the second bale forming chamber.

Alternatively, in an embodiment with a belt version of the apparatus, (such as shown in FIG. 47) the urging means may comprise a disc mechanism for urging, by pushing, the bale from the first bale forming chamber to the second bale forming chamber. In this embodiment, the problem of the frictional forces between the bale and the side walls of the first bale forming chamber is substantially overcome by providing the disc mechanism to urge the bale to the second bale forming chamber. Optionally, the disc mechanism for urging the bale from the first bale forming chamber to the second bale forming chamber may comprise a rotating disc with mountable rollers. As the disc of the disc mechanism rotates with the rollers attached to push the bale into the second bale forming chamber, the chamber wall which is comprised of the rotating disc also rotates, so as the chamber wall rotates, the bale is moving with the wall, so in other words, the chamber wall and the bale are moving with each other and not fighting through frictional contact.

In a preferred embodiment of the round bale forming apparatus of the present invention, the feeding mechanism for feeding crop product into the bale forming apparatus in order to form a bale from the crop product also includes a cutting means.

The feeding means may comprise a cutting means. Indeed the function of the feeding means may be carried out by a cutting means alone. Throughout this specification, the term "feeder and/or cutting means" is also used to indicate this.

In another important aspect of the present invention, the feeding and/or cutting means is located in a position in the bale forming apparatus to directly feed the first bale forming chamber and/or the second bale forming chamber. The first bale forming chamber is located above the feeding means. Preferably, the first bale forming chamber is located substantially directly above the central longitudinal axis of the feeding means, in particular, the central longitudinal axis of the feeding means rotor. Most preferably, the central longitudinal axis of the first bale forming chamber is located substantially directly above the central longitudinal axis of the rotor of the feeding mechanism. The feeding mechanism is also provided in front of the second bale forming chamber and preferably, substantially in front of the lower section of the second bale forming chamber.

This arrangement of the location of the feeding mechanism and relative orientation with respect to the first bale forming chamber and the second bale forming chamber has the advantage that by its location, the same feeding mechanism, e.g. feeding rotor can feed both chambers. This important advantage arises as a result of the location of the feeding mechanism because the first started roller of each chamber is approximately the same distance from the tip of the feeding rotor as the crop product e.g. grass leaves the feeding rotor.

The design of the first bale forming chamber door is a preferred feature with the door being split by a longitudinal cut, at an angle, along the side walls of the first bale forming chamber. This angled cut is set out substantially at the same angle as the angle of the belt of the transfer mechanism i.e. at approximately 45 degrees to the horizontal axis; which means that the guide walls, i.e. the chambers walls can be kept at a constant height, resulting in minimum friction to the bale as the bale passes to the main chamber. Due to the above features, baling apparatus length is kept to a minimum, therefore balers structures weight can be kept to a minimum.

Advantageously, the transfer mechanism is pivotably moveable predominately around the centre of the feeding and/or cutting means.

Preferably, the transfer mechanism pivots predominately around the centre of the feeding and/or cutting means to provide a cover over the feeding and/or cutting means for transfer of the partially formed bale, allowing transfer of the partially formed bale to main bale forming chamber.

Advantageously, the transfer mechanism pivots predominately around the centre of the feeding and/or cutting means to move or push partially formed bale into the main, i.e. the second bale forming chamber.

Conveniently, the directional mechanism is adapted to provide alternate pathways for feeding crop product between the first bale forming chamber and the second bale forming chamber. The directional mechanism is adapted to be moveable between a first position in which crop product from the feeding mechanism is directed into the first bale forming chamber and a second position in which crop product from the feeding mechanism is directed into the second bale forming chamber.

Advantageously, the directional means predominately follows the circumference of the feeding and or cutting means to provide a pathway to the first bale forming chamber.

Ideally, the directional means is moveable, for example by moving through an arc or by folding out of the way so as to provide a pathway to the main bale forming chamber.

The directional means provides the crop feed switching mechanism for delivery directly to the second chamber as well as direct delivery to the first chamber; the directional means may be adapted to move along with the flow of the grass, e.g. switching grass to front chamber; the plates move in direction of the grass. When switching the crop product feed to the second bale forming chamber, the plates move downwardly—moving in the direction the crop product e.g. grass, wants to be pushed by the rotor.

The operating principle for the baling apparatus of the invention will now be described in general terms. It will be understood that the baling system of the invention is suitable for use in balers comprising either a fixed chamber roller system or a variable diameter belt system or a combination of a fixed chamber roller system and a variable diameter belt system. Accordingly, reference to the use of the present invention in the following embodiment should not be seen as limiting.

In one embodiment of the invention, a crop product such as grass or hay is fed through a cutting mechanism into the first bale forming chamber. The grass or hay fed into the first bale forming chamber is subjected to a tumbling action by the movement of the bale forming system to form a partially formed bale or primary bale in the first bale forming chamber.

It is to be understood that the terms, "partially formed bale" or "primary bale" are used interchangeably throughout the specification to describe a small bale that is formed in the first bale forming chamber.

On reaching a pre-determined diameter and/or density, the partially formed bale is transferred by the transfer mechanism to a second bale forming chamber. Concurrently, the directional means also alters the pathway of the grass and hay being fed into the chambers such that the grass or hay is directed into the second bale forming chamber. The grass or hay continues to feed into the bale whilst in the second bale forming chamber thereby allowing the bale to reach full size in the second bale forming chamber. Once the bale has reached a required diameter and/or density, a sensor is triggered which causes the transfer mechanism to alter the pathway of the grass or hay such that it is redirected into the first bale forming chamber thereby starting the process of forming a partially formed bale in the first bale forming chamber again. The sensor also triggers a wrapping mechanism which will then wrap the fully formed bale in netting or any appropriate material as deemed suitable by a person skilled in the art. Once the fully formed bale is wrapped, a door opens and allows the wrapped fully formed bale to be ejected from the second bale forming chamber.

Accordingly, in another aspect, the present invention also provides a method of forming a round bale using a round bale forming apparatus, the method being suitable for use in bale forming apparatus comprising a bale forming system comprising a fixed chamber roller system; or a variable diameter belt system; or a combination of a fixed chamber roller system and a variable diameter belt system, the method comprising:

(a) Providing a bale forming apparatus comprising a first bale forming chamber and a second bale forming chamber; and a transfer mechanism for transferring a partially formed bale from the first bale forming chamber into the second bale forming chamber and directional means for directing the crop products from the feeding mechanism into the first or second bale forming chamber such that a partially formed bale is formable in the first bale forming chamber and a fully formed bale is formable in the second bale forming chamber;

(b) Feeding a supply of a crop product through a cutting mechanism into the first bale forming chamber in the bale forming apparatus;

(c) Subjecting the crop product in the first bale forming chamber to a tumbling action by the movement of the bale forming system to form a partially formed bale or primary bale in the first bale forming chamber;

(d) Continuing to supply the crop product to the first bale forming chamber until the partially formed bale reaches a pre-determined diameter and/or density;

(e) On reaching the pre-determined diameter and/or density, the partially formed bale is transferred by a transfer mechanism to a second bale forming chamber;

(f) Concurrently with step (d), altering the pathway of the supply of crop product being fed into the bale forming apparatus such that the crop product is directed into the second bale forming chamber;

(g) Continuing to supply the crop product into the second bale forming chamber so that the bale continues to be supplied with crop product so as to form a full size bale in the second bale forming chamber;

(h) Once the bale has reached a required diameter and/or density, triggering a sensor which causes the transfer mechanism to alter the pathway of the crop product such that it is redirected into the first bale forming chamber thereby starting the process of forming a second partially formed bale in the first bale forming chamber;

(i) simultaneously with step (h) the sensor also triggers a wrapping mechanism operable to wrap the fully formed bale in netting or any appropriate material as deemed suitable by a person skilled in the art; and (j) after the fully formed bale is wrapped, opening a door and allowing the wrapped fully formed bale to be ejected from the second bale forming chamber.

It is to be understood that the baling apparatus herein described is suitable to be drawn behind an appropriate vehicle, for example, a tractor or any other suitable vehicle known to a person skilled in the art. Alternatively, the baling apparatus herein described could be part of a self propelled vehicle.

The invention will now be described more particularly with reference to the accompanying drawings, which show by way of example only, a number of embodiments of a round baler in accordance with the invention.

The most preferred embodiment is shown in FIG. 17 to FIGS. 25a, 25b and 25c inclusive of the accompanying drawings.

Figure 17:
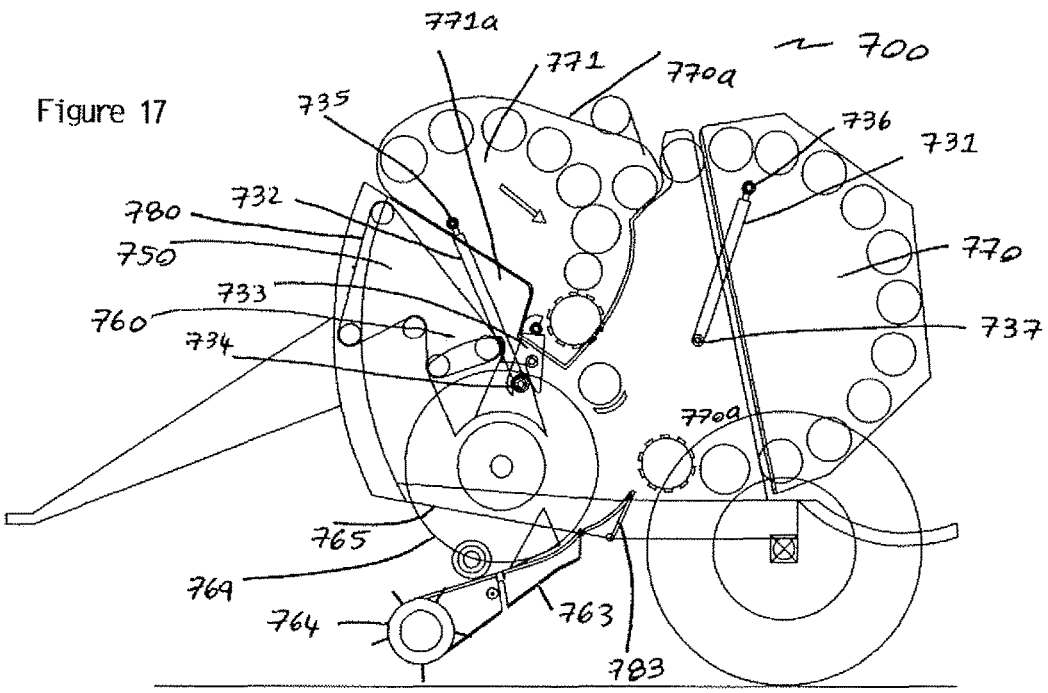
FIG. 17 is a cross-section side elevation of a third embodiment of the bale forming apparatus of the invention.
Figure 25:
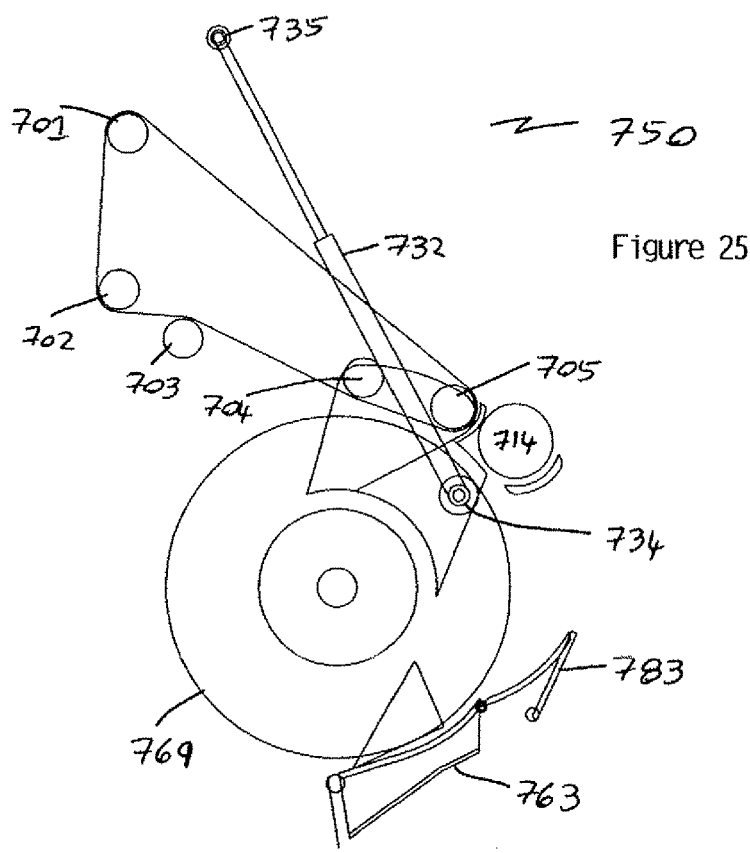
FIG. 25 is an enlarged cross-section side elevation of the hood mechanism of FIGS. 20 and 21.
Figure 25A:
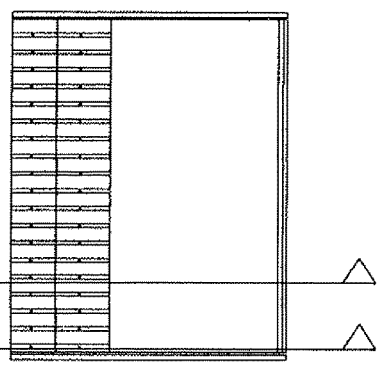
Figure 25A:
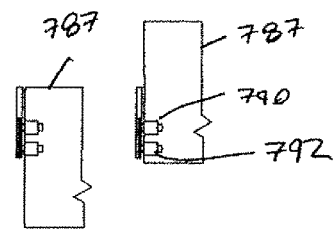
Figure 25B:
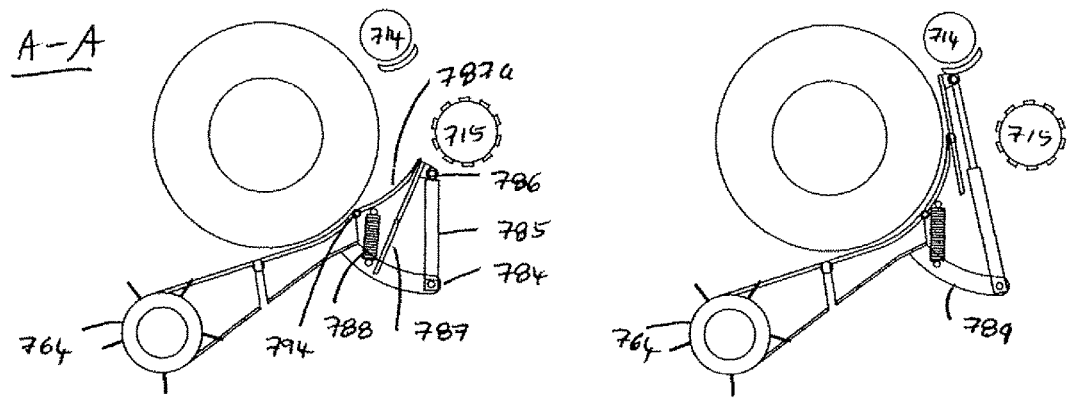
Figure 25C:
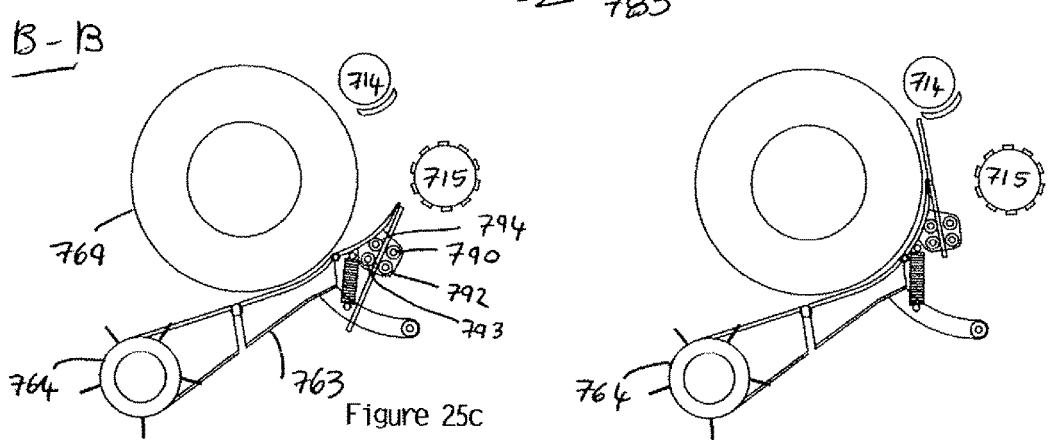
Figure 26:
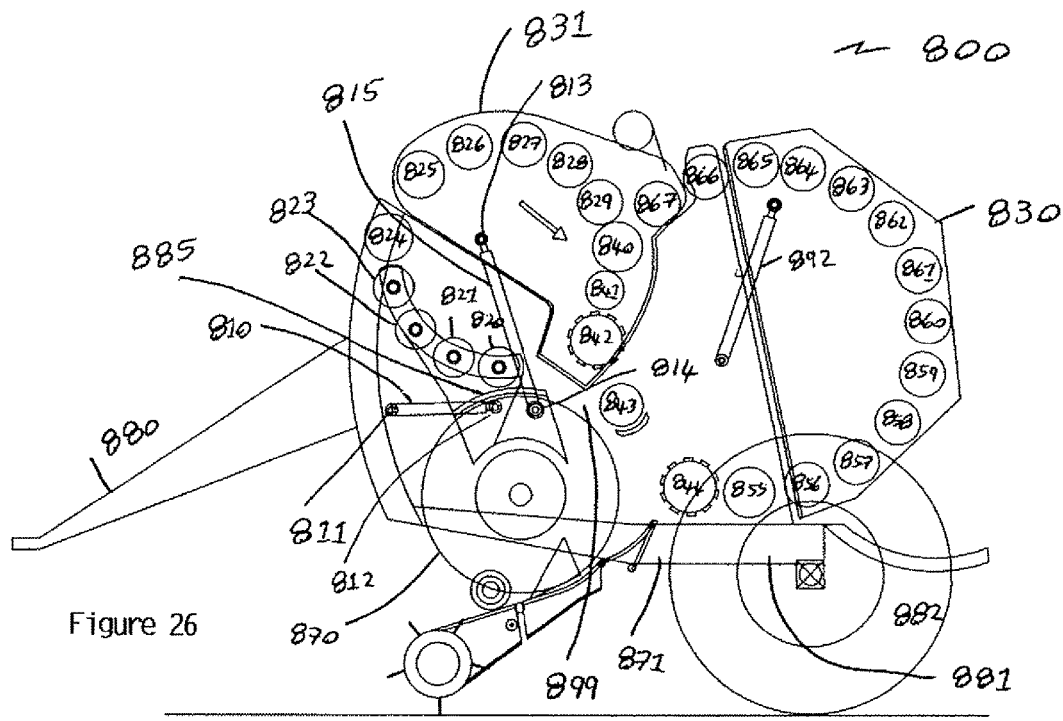
Figure 27:
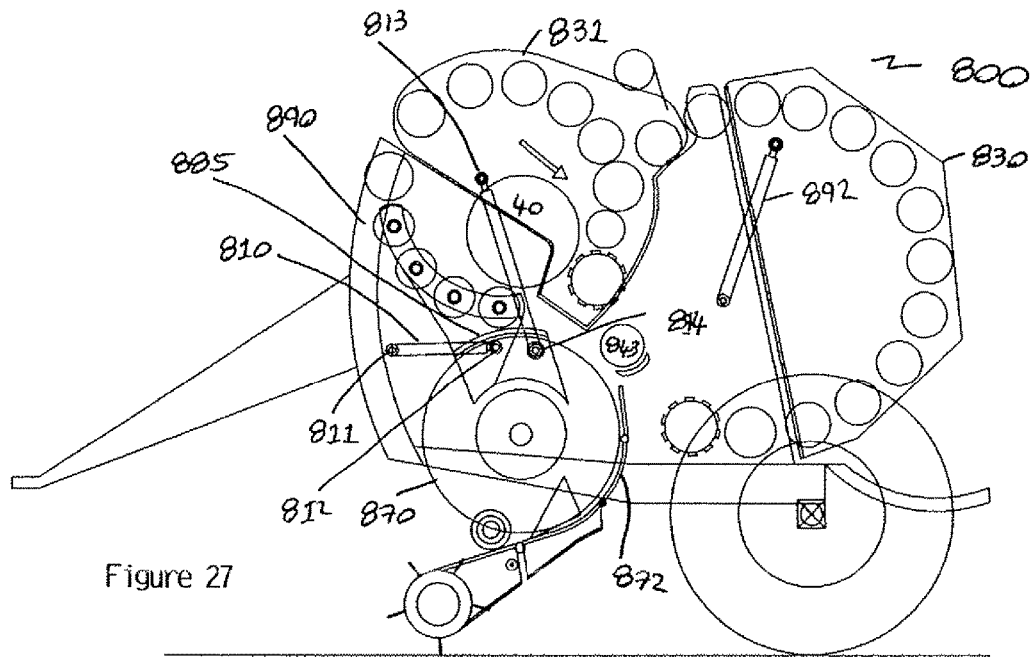
Figure 28:
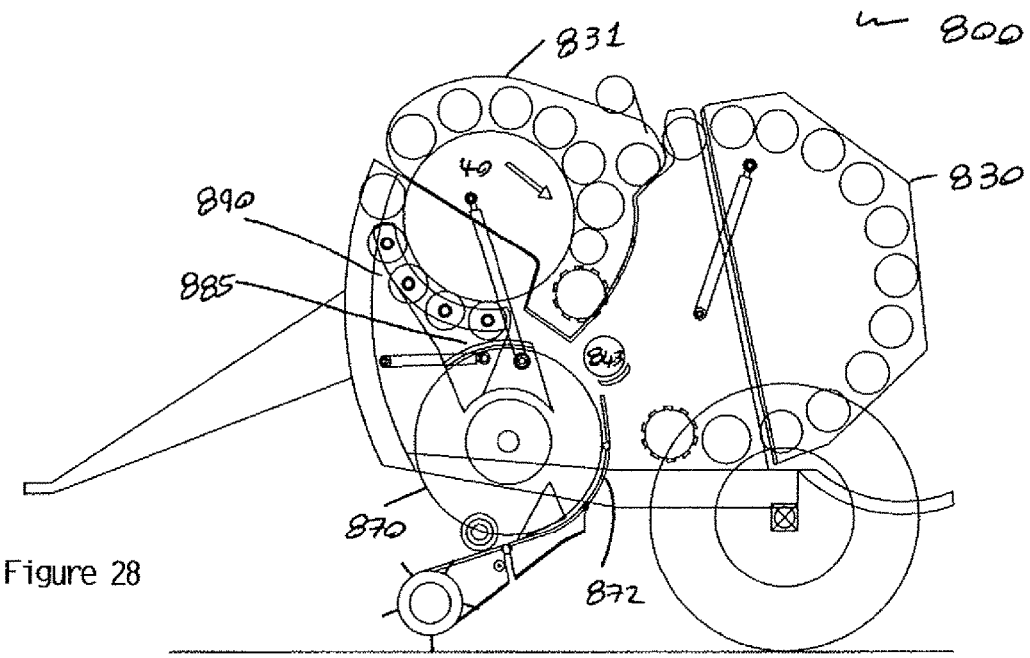
Figure 29:
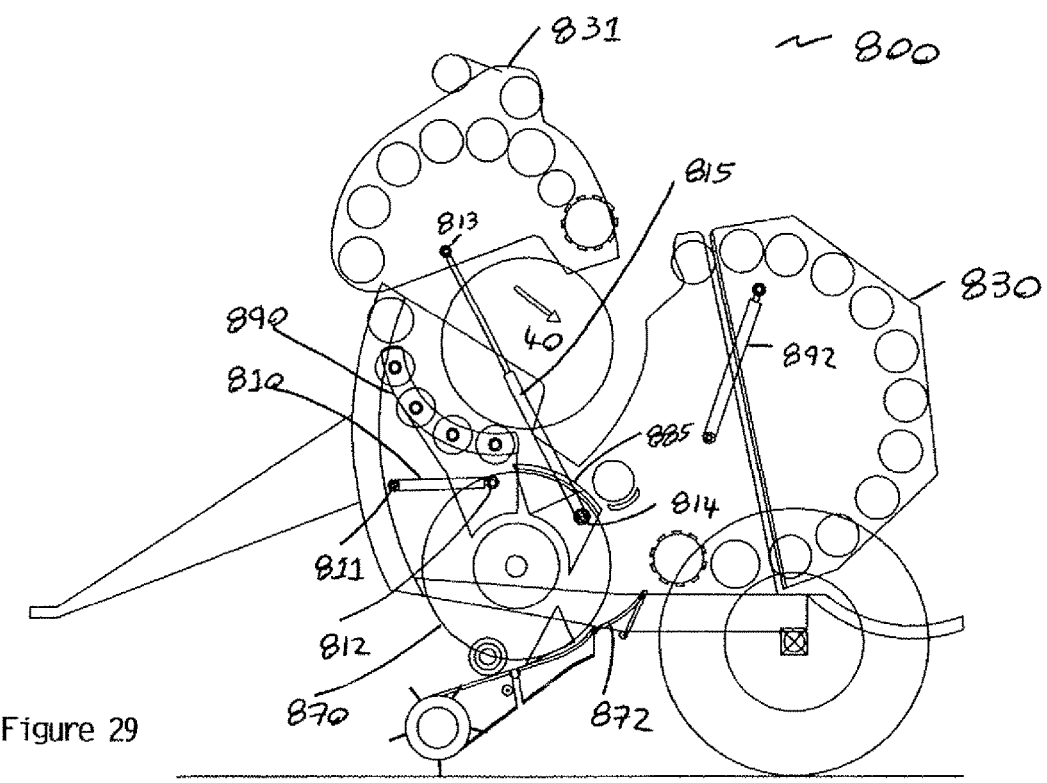
Figure 30:
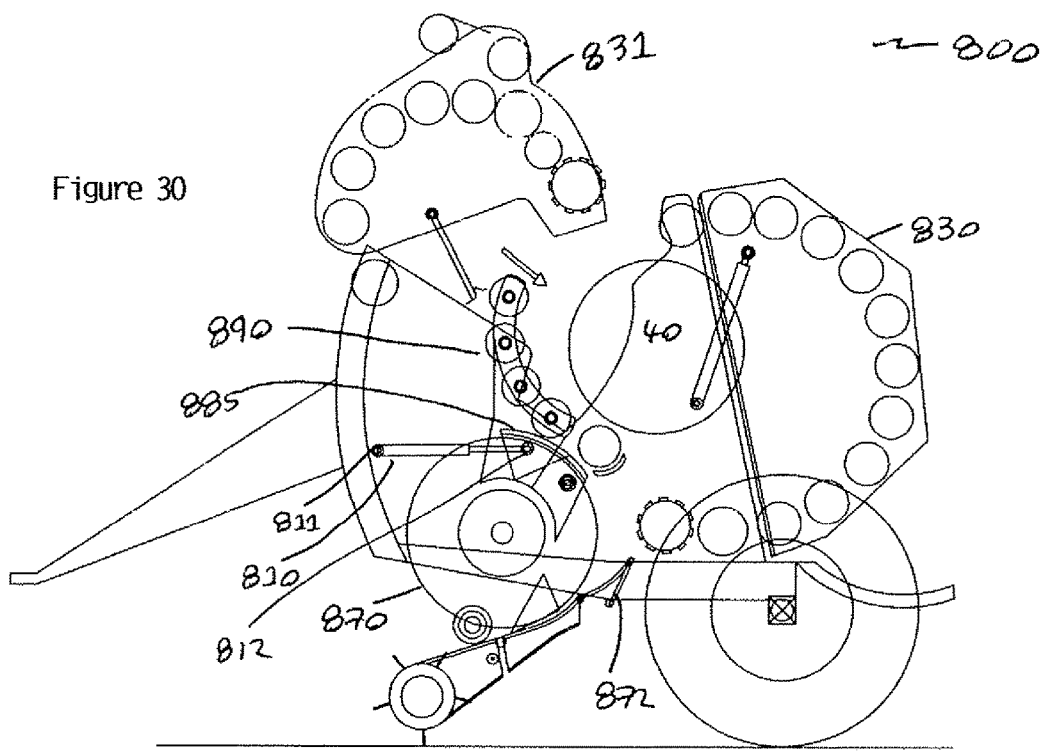
Figure 31:
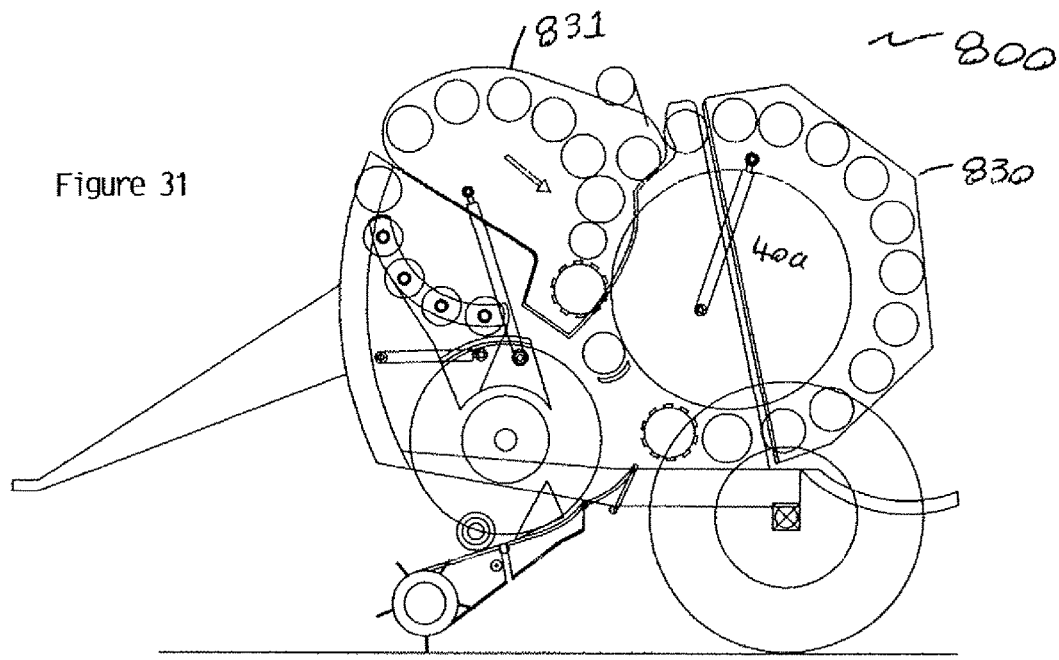
Figure 32:
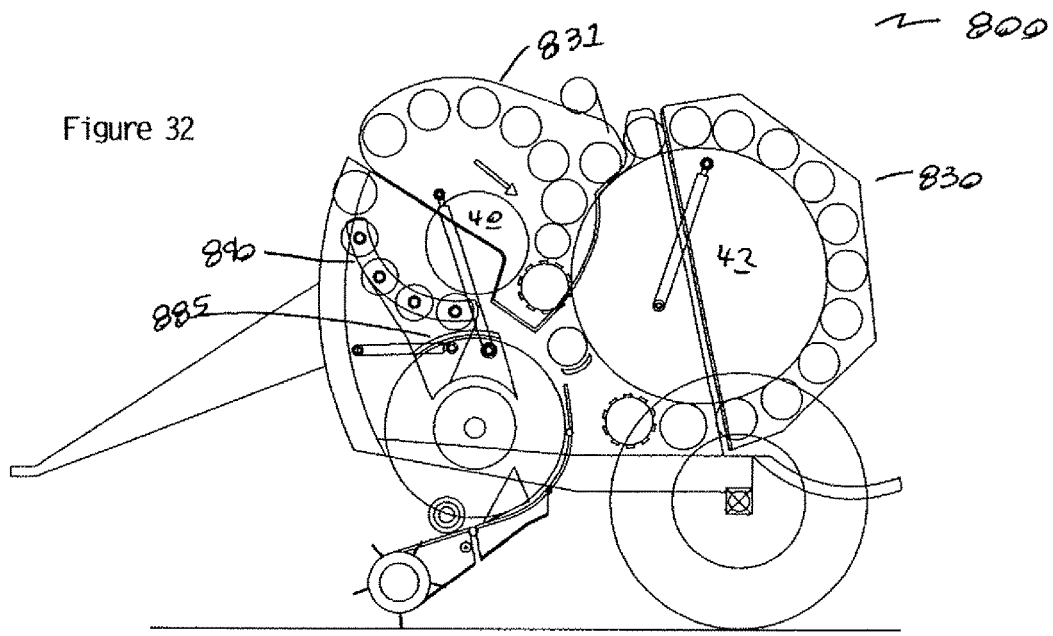
Figure 33:
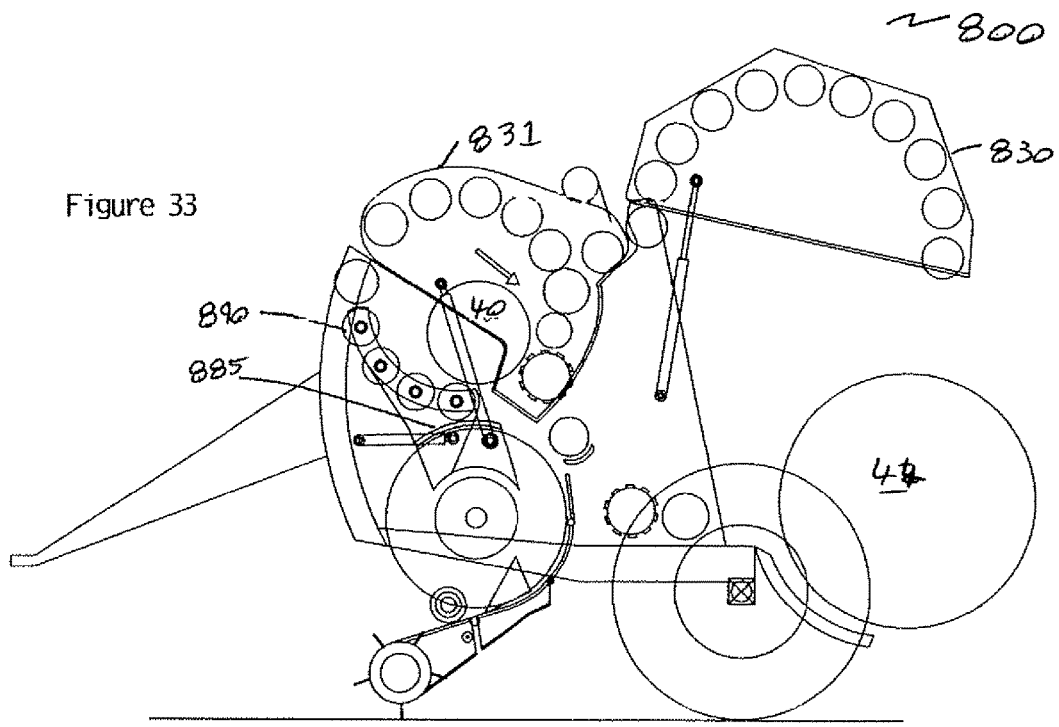
Figure 34:
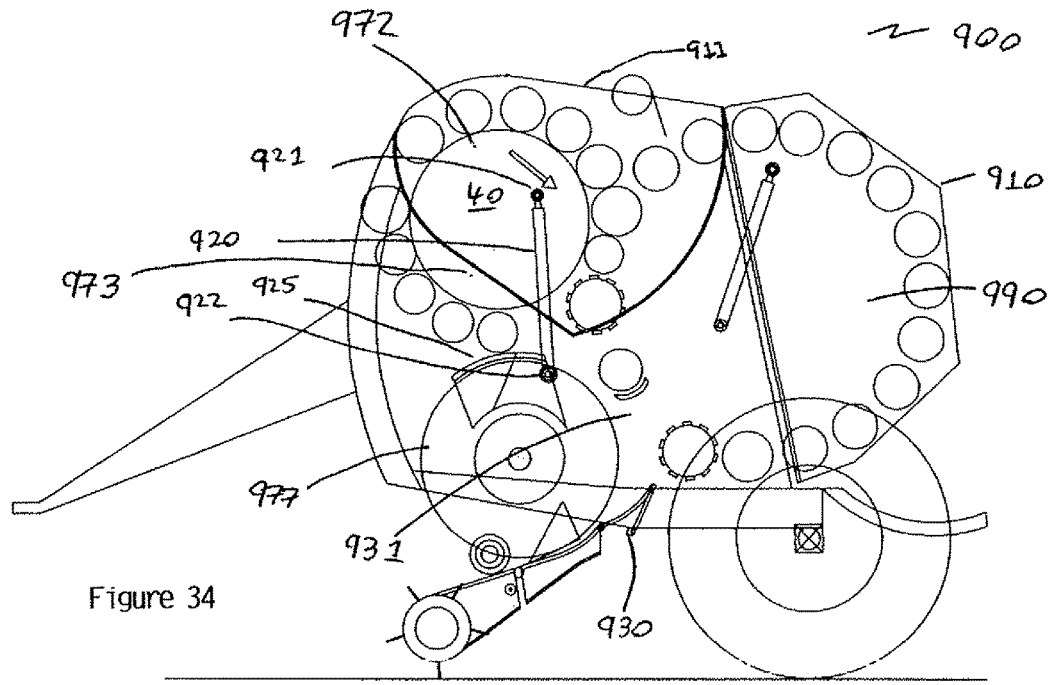
Figure 35:
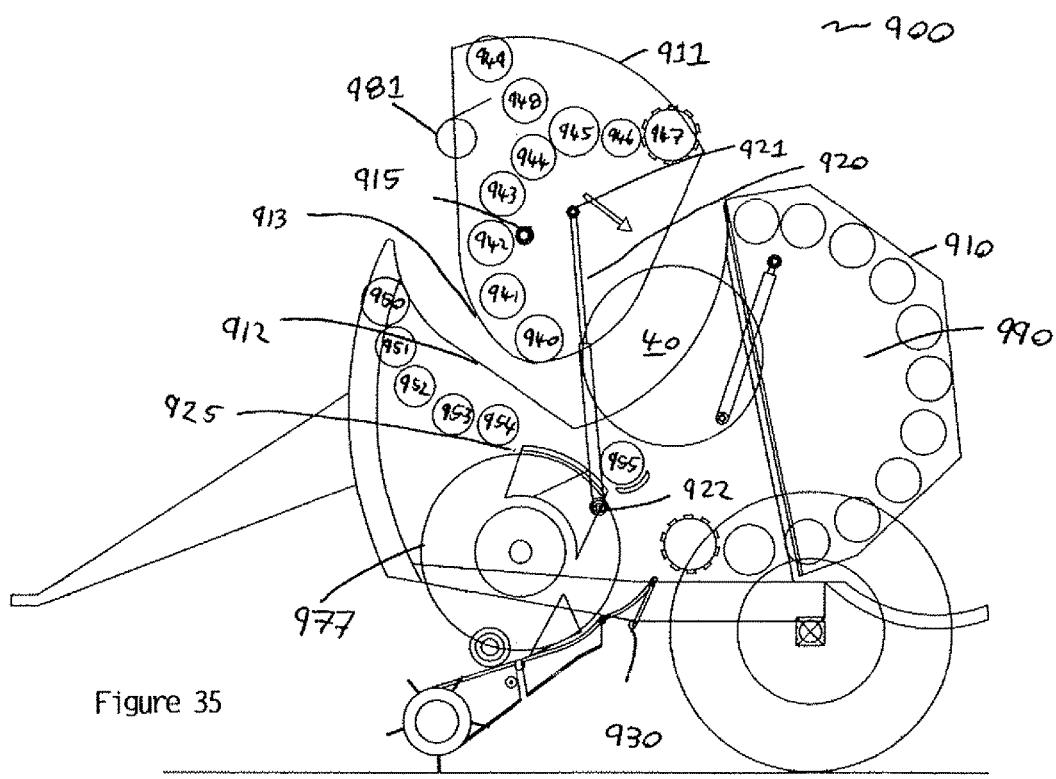
Figure 36:
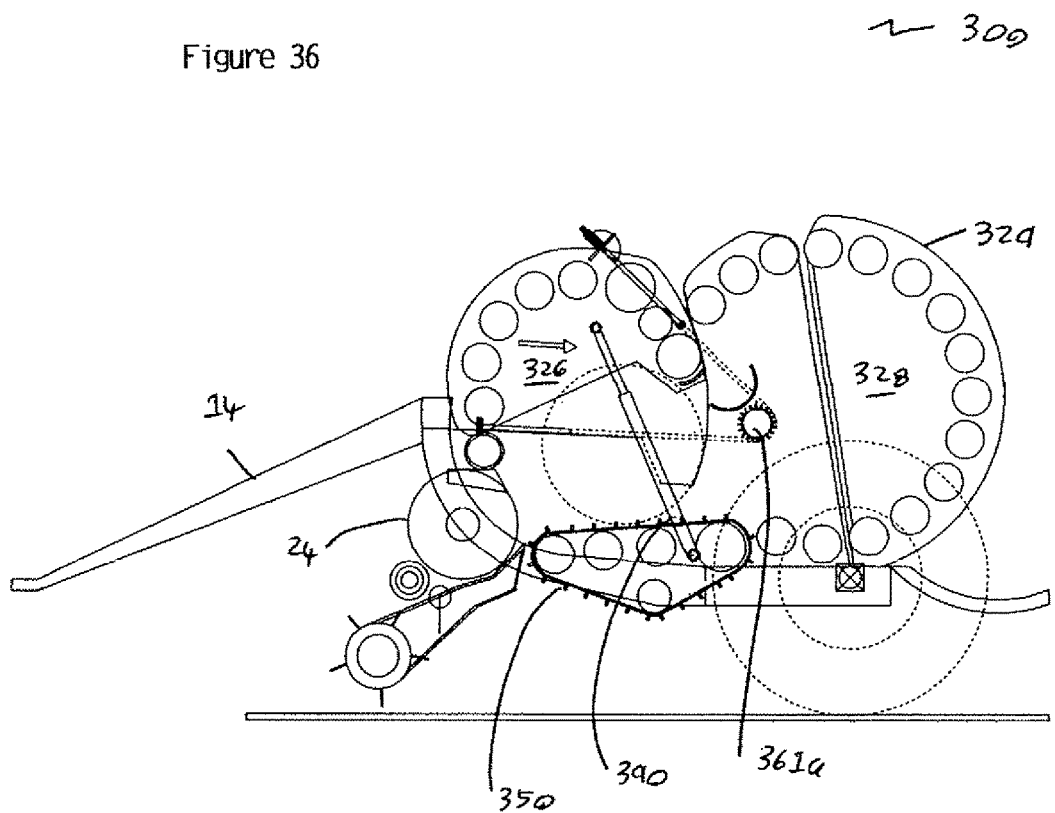
Figure 37:
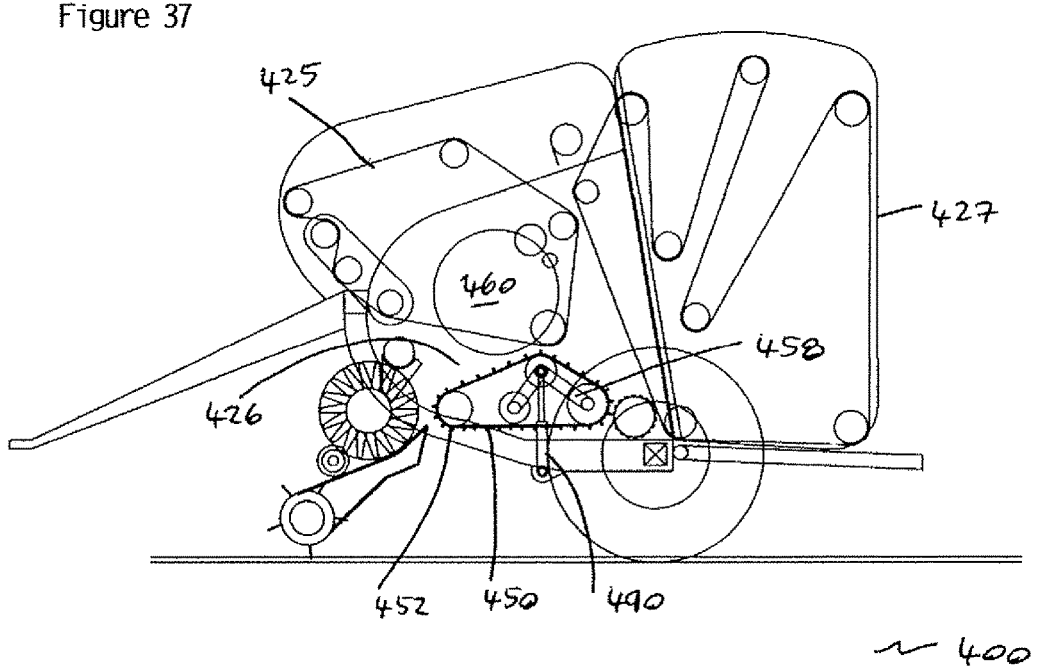
Figure 38:
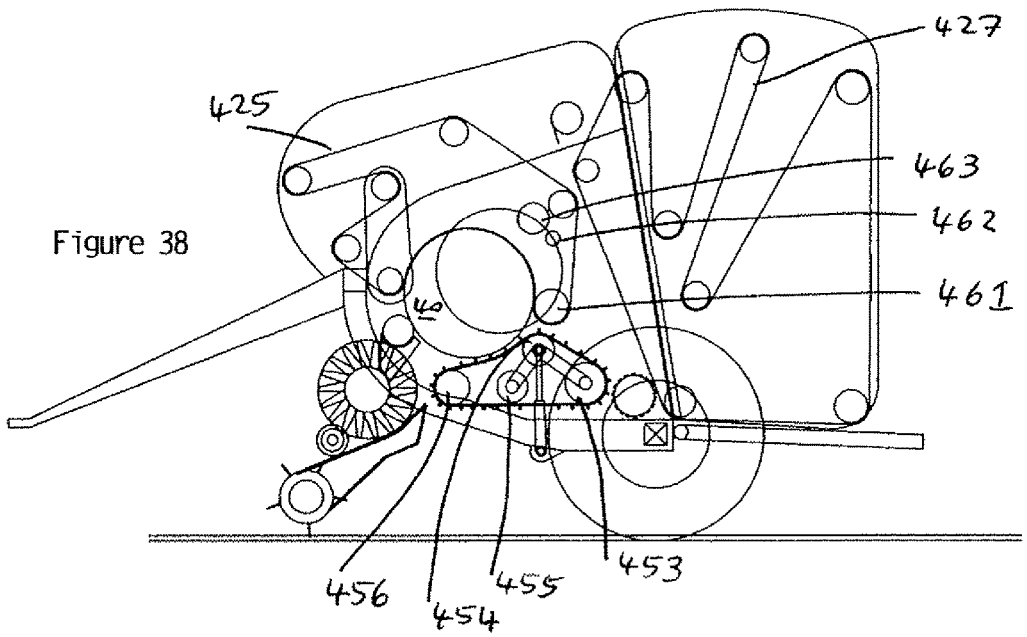
Figure 39:
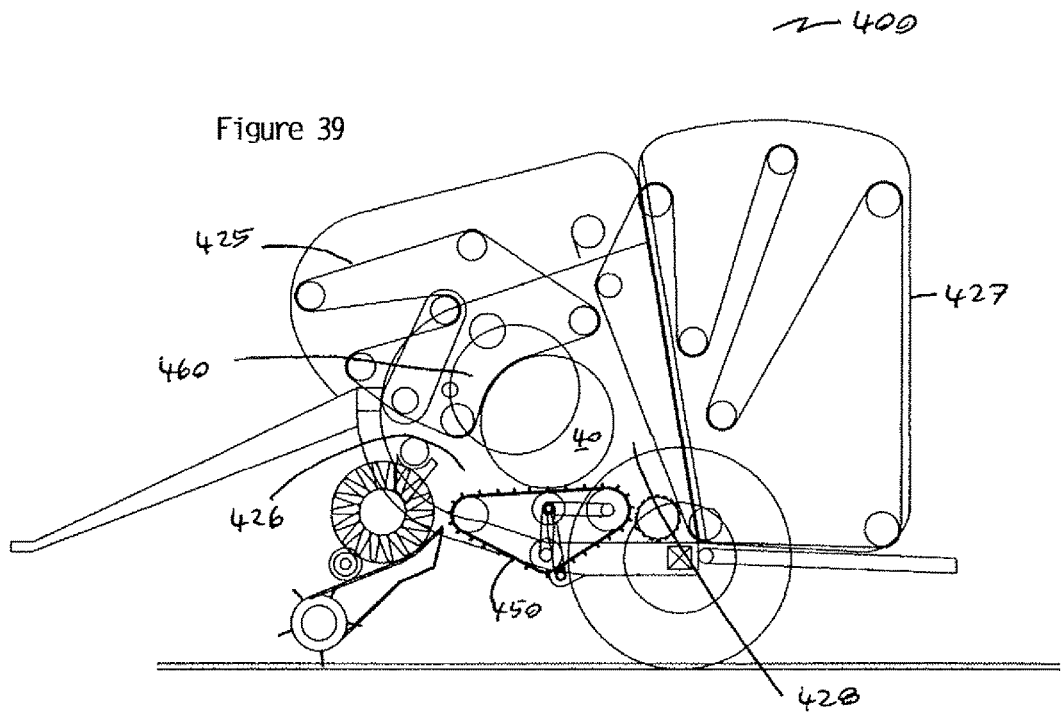
Figure 40:
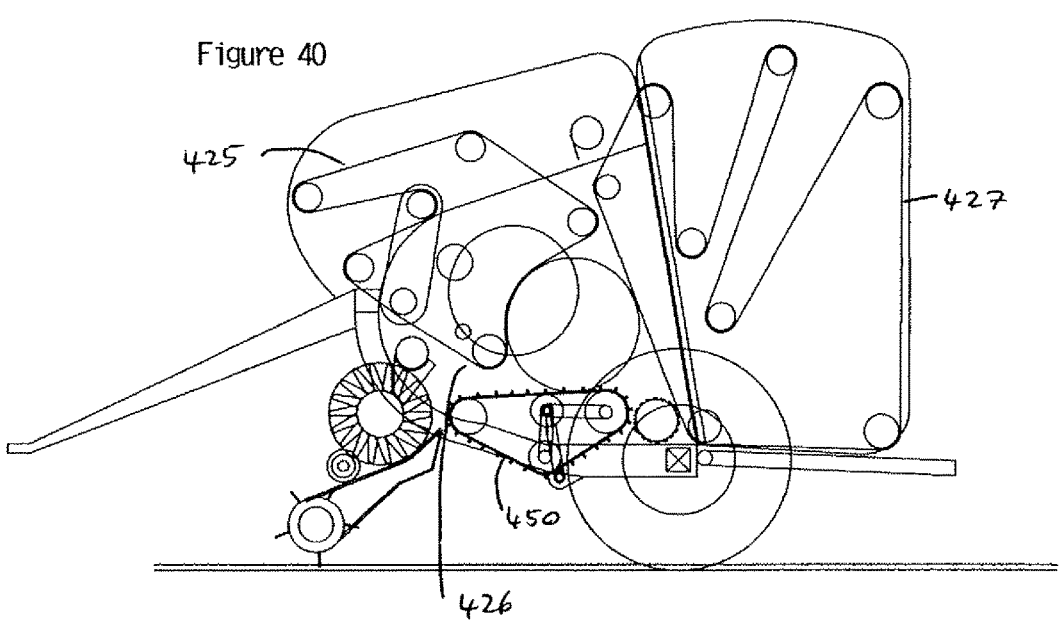
Figure 41:
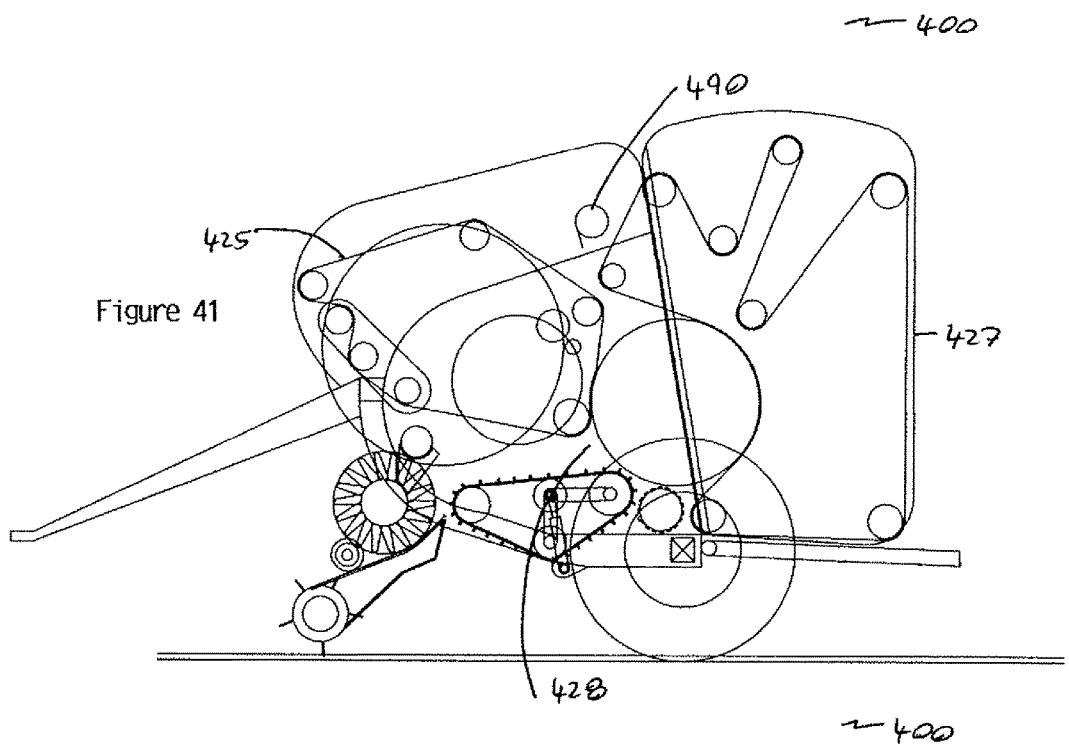
Figure 42:
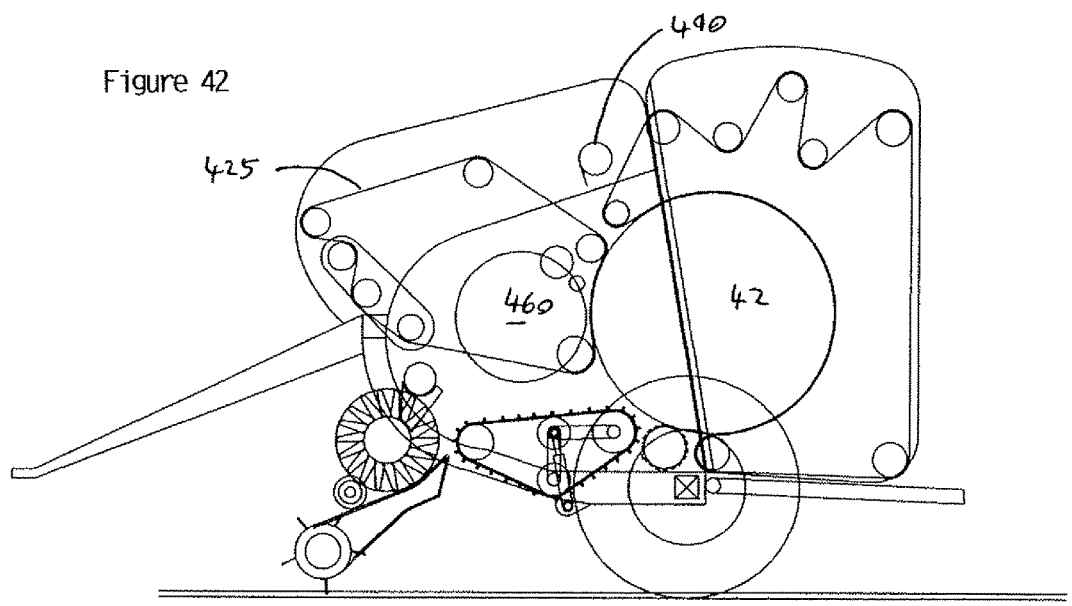
Figure 43:
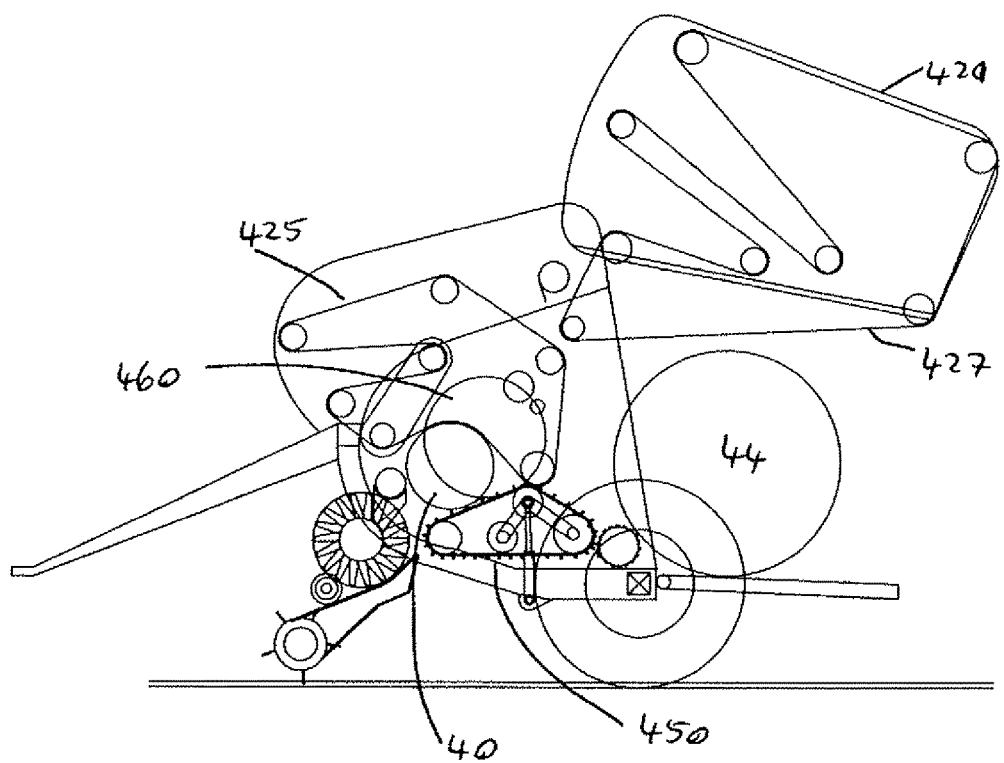
Figure 44:
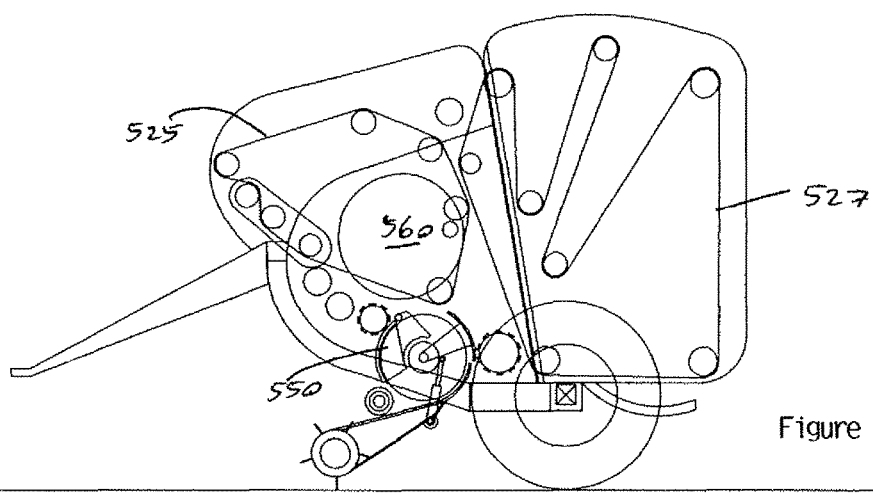
Figure 45:
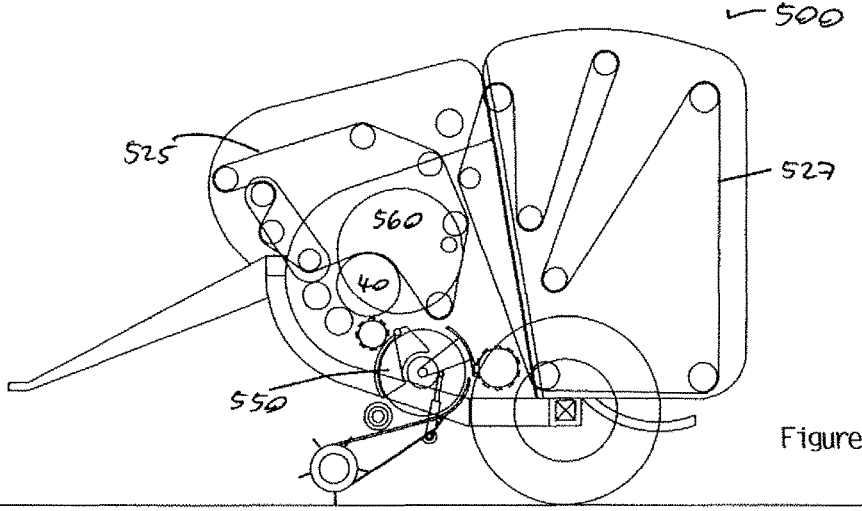
Figure 46:
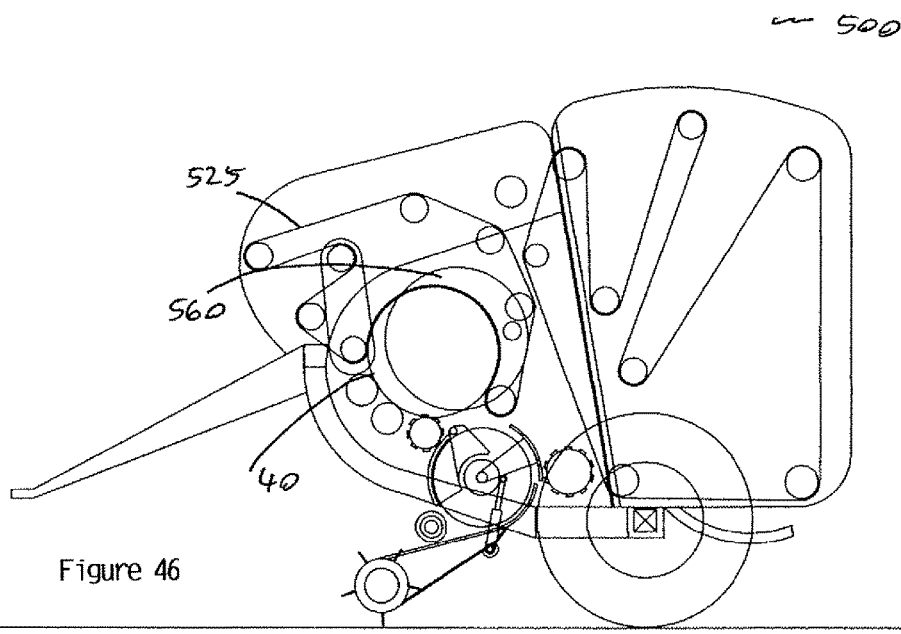
Figure 47:
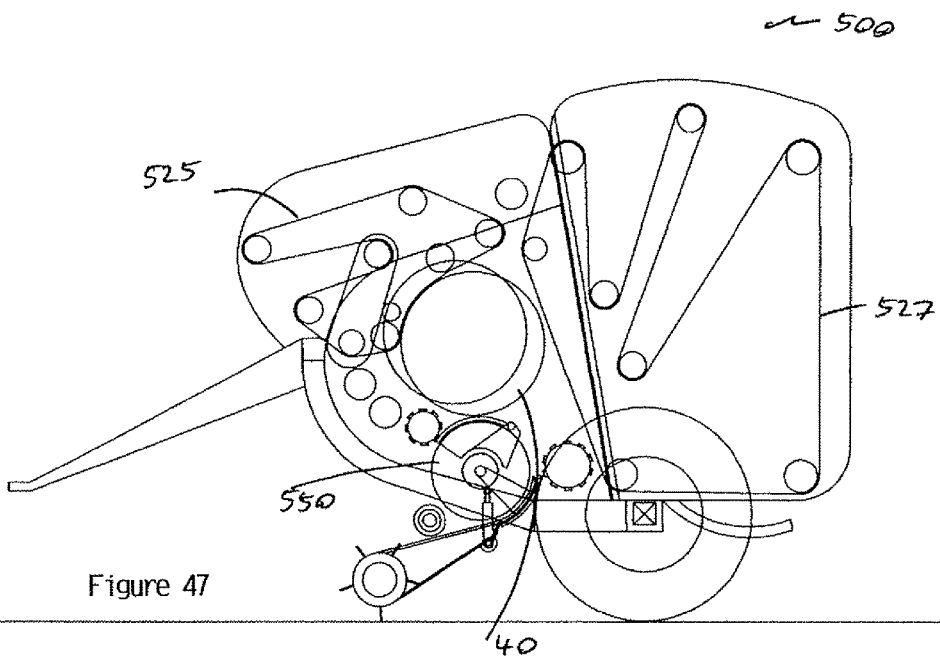
Figure 48:
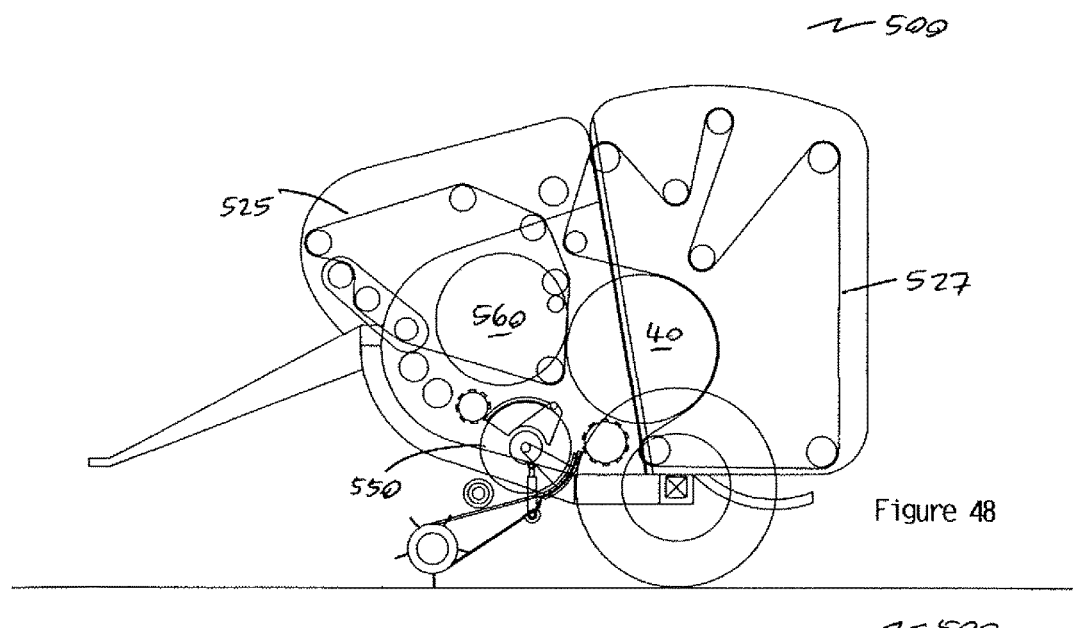
Figure 49:
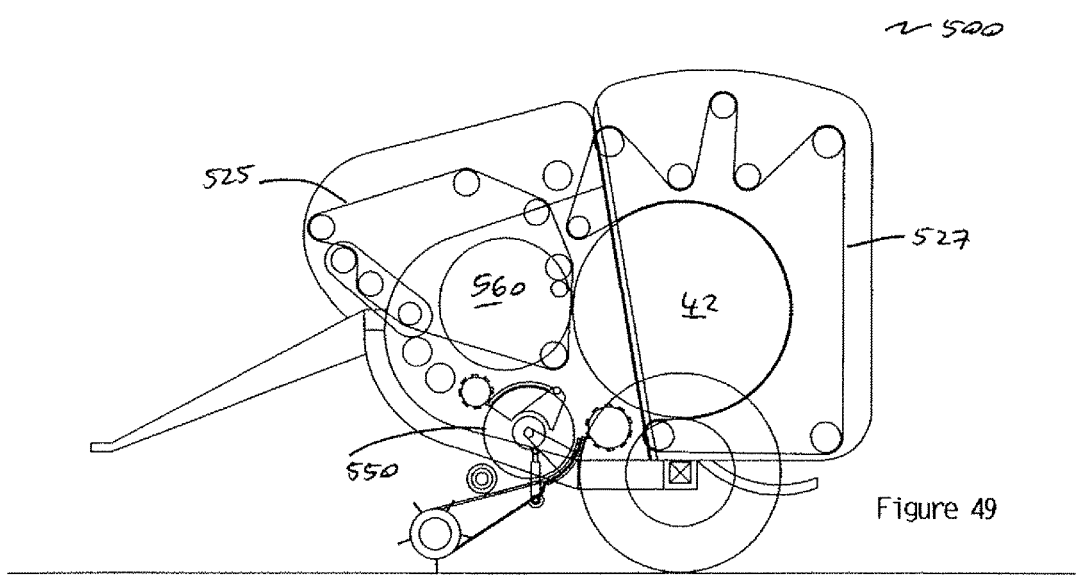
Figure 50:
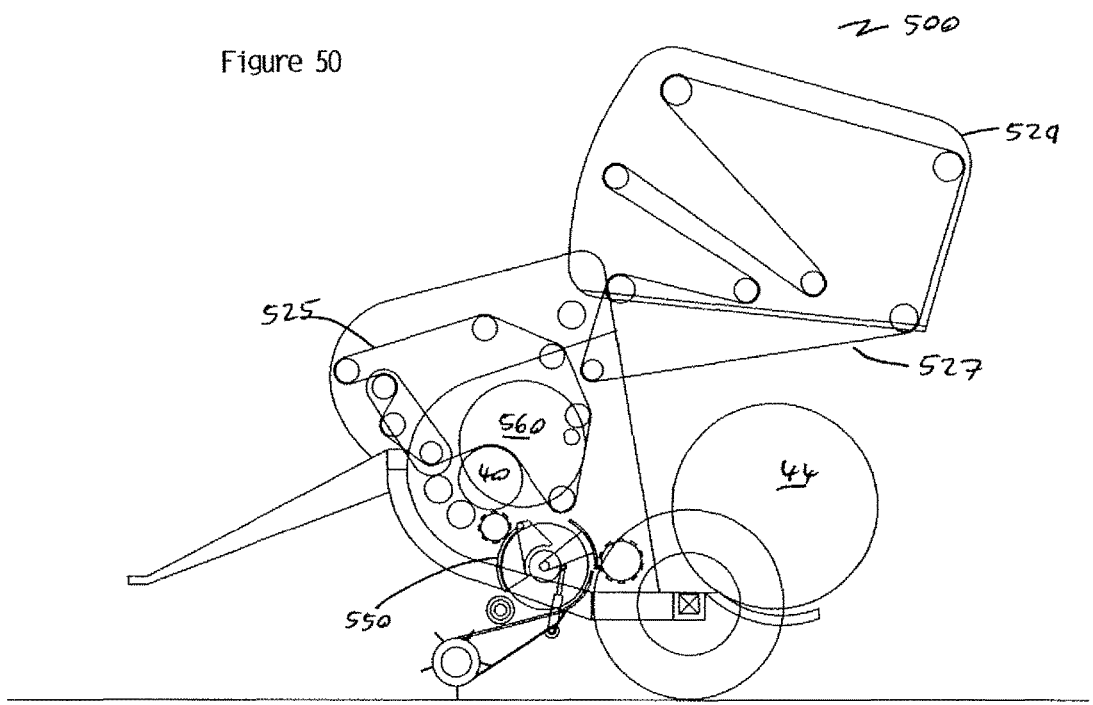
Figure 51:
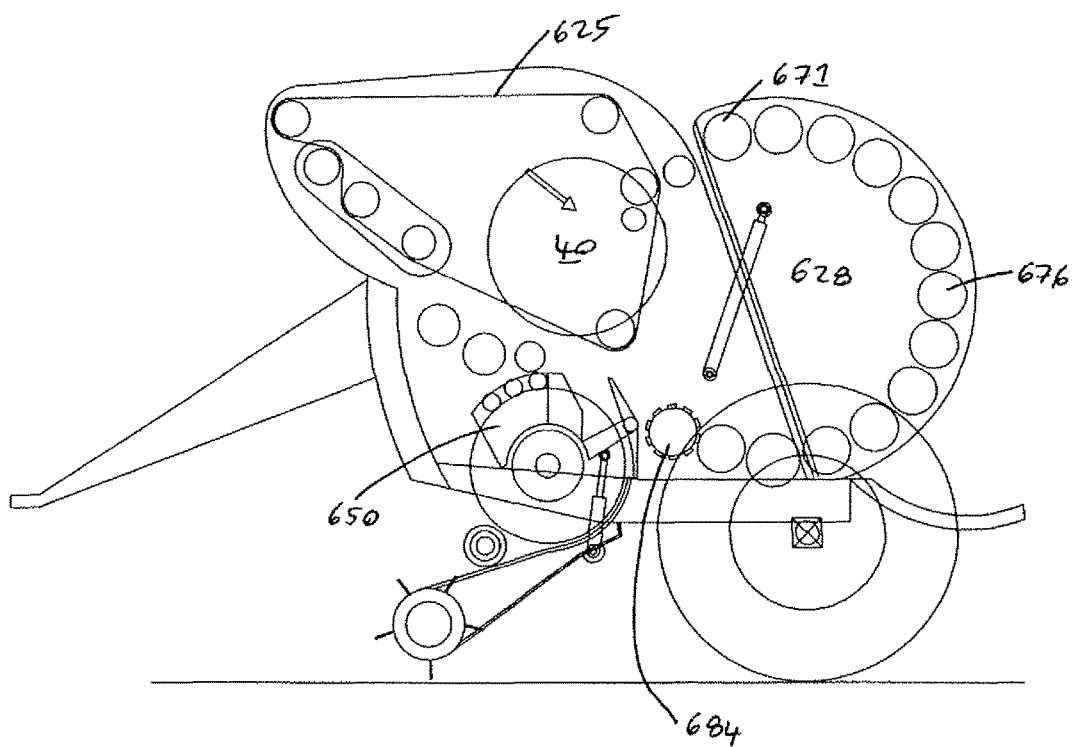

FIG. 25a is a plan view of the cutting mechanism 769 and the grass pick up mechanism 764. The plan view outlines the sections taken through the cutting mechanism 769 and the grass pick up mechanism 764 for the enlarged cross section views of FIG. 25 b and FIG. 25 c;

FIG. 25b is an enlarged cross sectional view A-A which is a cross section side elevation of the grass directional plate type mechanism 783 in the folded down position to feed crop material to the second bale forming chamber. Also shown on this cross section is the balers grass pick up mechanism 764 and the feeding and or cutting mechanism 769;

FIG. 25c is an enlarged cross sectional view B-B which is a cross section side elevation of the grass directional plate type mechanism 783 in the folded up position to feed crop material to the first bale forming chamber. In the folded up position the directional plate mechanism predominately follows the arc of the feeding and or cutting mechanism. Also shown on this cross section is the balers grass pick up mechanism 764 and the feeding and or cutting mechanism 769;

FIG. 26 is a cross-section side elevation of a fourth embodiment of the bale forming apparatus of the invention;

FIG. 27 is a cross-section side elevation of the bale forming apparatus of FIG. 26 with a bale beginning to form in the first bale forming chamber;

FIG. 28 is a cross-section side elevation of the bale forming apparatus of FIG. 26 with a primary bale formed in the first bale forming chamber;

FIG. 29 is a cross-section side elevation of the bale forming apparatus of FIG. 26 showing the start of the transfer of the primary bale of FIG. 28 from the first bale forming chamber to the second bale forming chamber;

FIG. 30 is a cross-section side elevation of the bale forming apparatus of FIG. 26 showing the primary bale during the process of transferring into the second bale forming chamber. The primary bale is being pushed and lifted by the transferring means;

FIG. 31 is a cross-section side elevation of the bale forming apparatus of FIG. 17 showing the primary bale after being transferred from the first bale forming chamber to the second bale forming chamber;

FIG. 32 is a cross-section side elevation of the bale forming apparatus of FIG. 26 showing the final bale being wrapped in the second bale forming chamber and a new primary bale beginning to form in the first bale forming chamber;

FIG. 33 is a cross-section side elevation of the bale forming apparatus of FIG. 26 showing the final bale being ejected from the second bale forming chamber and the primary bale being formed in the first bale forming chamber;

FIG. 34 is a cross-section side elevation of a fifth embodiment of the bale forming apparatus of the invention. FIG. 34 shows the primary bale formed in the first bale forming chamber;

FIG. 35 is a cross-section side elevation of FIG. 34. FIG. 35 shows the process of transferring the primary bale from the first bale forming chamber to the second bale forming chamber;

FIG. 36 is a cross-section side elevation of a sixth embodiment of the bale forming apparatus of the invention. FIG. 36 shows the primary bale formed in the first bale forming chamber and the process of the transfer is taking place into the second bale forming chamber;

FIG. 37 is a cross-section side elevation of a seventh embodiment of the bale forming apparatus of the invention;

FIG. 38 is a cross-section side elevation of the bale forming apparatus of FIG. 37 with a primary bale beginning to form in the first bale forming chamber;

FIG. 39 is a cross-section side elevation of the bale forming apparatus of FIG. 37 showing the initiation of the transfer of the primary bale of FIG. 38 from the first bale forming chamber to the second bale forming chamber;

FIG. 40 is a cross-section side elevation of the bale forming apparatus of FIG. 37 showing the continued transfer of the primary bale of FIG. 38 from the first bale forming chamber to the second bale forming chamber;

FIG. 41 is a cross-section side elevation of the bale forming apparatus of FIG. 37 showing the primary bale in the second bale forming chamber;

FIG. 42 is a cross-section side elevation of the bale forming apparatus of FIG. 37 showing the final bale being formed in the second bale forming chamber;

FIG. 43 is a cross-section side elevation of the bale forming apparatus of FIG. 37 showing the final bale being ejected from the second bale forming chamber;

FIG. 44 is a cross-section side elevation of an eight embodiment of the bale forming apparatus of the invention;

FIG. 45 is a cross-section side elevation of the bale forming apparatus of FIG. 44 with a primary bale beginning to form in the first bale forming chamber;

FIG. 46 is a cross-section side elevation of the bale forming apparatus of FIG. 44 with the primary bale formed in the first bale forming chamber;

FIG. 47 is a cross-section side elevation of the bale forming apparatus of FIG. 44 showing the initiation of the transfer of the primary bale of FIG. 27 from the first bale forming chamber to the second bale forming chamber;

FIG. 48 is a cross-section side elevation of the bale forming apparatus of FIG. 44 showing the primary bale in the second bale forming chamber;

FIG. 49 is a cross-section side elevation of the bale forming apparatus of FIG. 44 showing the final bale being formed in the second bale forming chamber;

FIG. 50 is a cross-section side elevation of the bale forming apparatus of FIG. 44 showing the final bale being ejected from the second bale forming chamber; and FIG. 51 is a cross-section side elevation of a ninth embodiment of the bale forming apparatus of the invention.

Referring to FIGS. 1 to 51, there are shown nine embodiments of the baling apparatus of the invention referred to by reference numerals 100, 200, 700, 800, 900, 300, 400, 500 and 600, respectively. The first six embodiments of the invention 100, 200, 700, 800 and 900, are the type of baling apparatus commonly known as a fixed chamber roller system. It is understood that the fixed chamber roller system has a plurality of separate endless rollers or conveyor units with transverse bars arranged across the width of the chassis 10 of the baling apparatus and surrounding the inner peripheral surface of the first and second bale forming chambers. The fixed chamber roller system forms bales of fixed diameter. Two further embodiments of the invention 400 and 500 are the type of baling apparatus commonly known as a variable diameter belt system. It is understood that the variable diameter belt system has one or more endless belts arranged across the width of the chassis 10 of the baling apparatus and surrounding the inner peripheral surface of the first and second bale forming chambers. The endless belts form a cavity which increases as the bale is being formed. In use the belt is tensioned at the outset. Various suitable components such as, for example, springs, moveable rollers and/or hydraulic mechanisms are used to retain tension on the belt, which allows the belt to take up or let out as required which in turn enables the belt to adapt to the shape of the bale as it is being formed. The variable diameter belt system is known to form bales of variable diameter. The ninth embodiment of the invention 600 combines the fixed chamber roller system with the variable diameter belt system.

Each embodiment of the baling apparatus 100, 200, 700, 800, 900, 300, 400, 500 and 600, respectively is shown as being suitable for coupling to a vehicle such as a tractor. It is also possible for each embodiment of the baling apparatus of the present invention to be part of a self propelled vehicle. Each embodiment of the baling apparatus 100, 200, 700, 800, 900, 300, 400, 500 and 600, is suitable for forming bales from cut crops such as grasses or hay.

Figure 1:
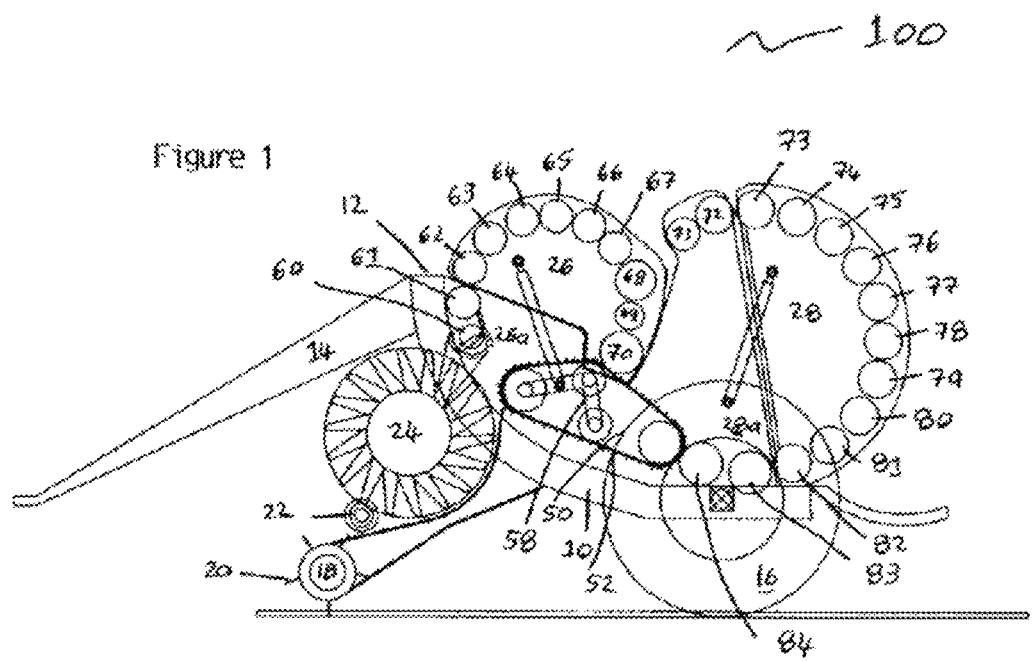
FIG. 1 is a cross-section side elevation of the bale forming apparatus of the invention.

The following general description of the structure of the baling apparatus is explained with specific reference to FIG. 1, however it is to be understood that each embodiment of the baling apparatus comprises a chassis 10 supported on a frame 12 bearing connecting means 14 for coupling the baling apparatus 100 to a tractor. The frame 12 is provided with wheels 16 to support and move the baling apparatuses 100, 200, 700, 800, 900, 300, 400, 500 and 600, on the ground.

Each embodiment of the baling apparatus 100, 200, 700, 800, 900, 300, 400, 500 and 600, is provided with a pick-up mechanism 18 which is provided with tines 20 to facilitate pick-up of the cut crop from the ground and feed it via an auger 22 into a cutting mechanism 24 before feeding the collected crop product into a first bale forming chamber 26.

In use, the auger 22 is used to funnel the crop product (e.g. grass, hay, any cereal product, cotton and any other crop product desired to be formed into a bale) into the cutting mechanism 24. The cutting mechanism 24 spins at an appropriate speed to cut or chop and feed the grass or hay into the passage 25 that leads into chambers 26 and 28 of the baling apparatuses 100, 200, 300, 400, 500 and 600.

In the first, second, third, fourth, and fifth embodiments 100, 200, 700, 800 and 900 respectively of the invention, the cutting mechanism 24 is shown as being larger than in those of the sixth, seventh, eight and ninth embodiments 300, 400, 500 and 600 of the invention respectively. The cutting mechanisms 24 shown in each embodiment are mere design alterations and are interchangeable as deemed necessary by a person skilled in the art. In the first, second, third, fourth and fifth embodiments, 100, 200, 700, 800 and 900 respectively of the invention, the cutting mechanism 24 is larger than those of the other embodiments 300, 400 and 500 because the first bale forming chamber 26 is positioned at a greater distance from the ground than the first bale forming chamber 26 of the remaining embodiments. It is estimated that the distance from ground level to the bottom of the first roller 60 in the first and second embodiments is approximately 1.3 meters. It is possible to use a smaller cutting mechanism 24 in the first and second embodiments 100 and 200 of the invention if so desired. Equally it is to be understood a larger cutting mechanism 24 could be used in each of the first to ninth embodiments.

The operating principle for the baling apparatus of the invention will now be described in general terms. It will be understood that the baling system of the invention is suitable for use in balers comprising either a fixed chamber roller system or a variable diameter belt system or a combination of a fixed chamber roller system and a variable diameter belt system. Accordingly, reference to the use of the present invention in the following embodiment 100 should not be seen as limiting. The specific method by which each embodiment reduces this principle to practice will be described in turn below.

As grass or hay is fed through passage 25 from the cutting mechanism 24 into the first bale forming chamber 26, the baling apparatus in each embodiment of the invention forms a partially formed bale or primary bale 40 in the first bale forming chamber 26. It is to be understood that the terms partially formed bale or primary bale are used interchangeably throughout the specification to describe a small bale that is formed in the first bale forming chamber 26. Although represented as a cylindrical bale in the drawings, in most instances the primary bale 40 will be a misshapen bale whose shape will be determined by the quantity of the hay or grass contained in the bale and the tumbling action used to form the bale 40 in the first bale forming chamber 26.

When the partially formed bale 40 reaches a required diameter and/or density, the partially formed bale 40 is transferred by a transfer mechanism 50 to a second bale forming chamber 28. Concurrently the transfer mechanism 50 also alters the pathway of the grass and hay being fed into the chambers such that the grass or hay is directed into the second bale forming chamber 28. Thus, the grass or hay continues to feed into the bale when the bale is in the second bale forming chamber 28 thereby allowing the bale 42 to reach full size in the second bale forming chamber 28. Once the bale has reached a required diameter and/or density, a sensor is triggered which causes the transfer mechanism 50 to alter the pathway of the grass or hay such that it is redirected into the first bale forming chamber 26 thereby starting the process of forming a partially formed bale 40 in the first bale forming chamber 26 again. The sensor also triggers a wrapping mechanism which will then wrap the fully formed bale 42 in netting or any appropriate material as deemed suitable by a person skilled in the art. Once the fully formed bale 42 is wrapped a door 29 opens and allows the wrapped fully formed bale 44 to be ejected from the second bale forming chamber 28.

A Fixed Chamber Roller System:

Referring now to FIGS. 1 to 7, there is shown the first embodiment of the baling apparatus of the invention indicated generally by reference numeral 100.

The first bale forming chamber 26 has a roller assembly comprising eleven rollers 60 to 70 which are arranged across the width of the chassis 10 and surrounding the inner peripheral surface 26b of the chamber 26. The first bale forming chamber 26 is positioned such that base portion 26a of the first bale forming chamber 26 is at a higher level than the base portion 28a of the second bale forming chamber 28. The transfer mechanism 50 forms part of the base portion 26a. The first bale forming chamber 26 is provided with a door 27.

The transfer mechanism 50 comprises a conveyor 52 arranged around a plurality of rollers 53, 54, 55 and 56. Rollers 53, 54 and 55 are connected to each other by connecting means 58 such that the rollers 53, 54 and 55 are spaced apart from each other in an L shaped format. The connecting means 58 is further connected to a drive mechanism 90 which is operable to move the position of the rollers 53, 54 and 55 relative to roller 56. Connecting means 58 maintains the positions of rollers 53, 54 and 55 relative to each other. Transfer mechanism 50 is shown in FIG. 1 in an initial position wherein rollers 53 and 55 are arranged such that they are parallel to each other and are approximately in the same horizontal plane. Roller 55 is positioned adjacent roller 70.

The drive mechanism 90 is shown as a hydraulic ram which is connected to connecting means 58 at one end and to the door 27 of the first bale forming chamber 26.

Figure 2:
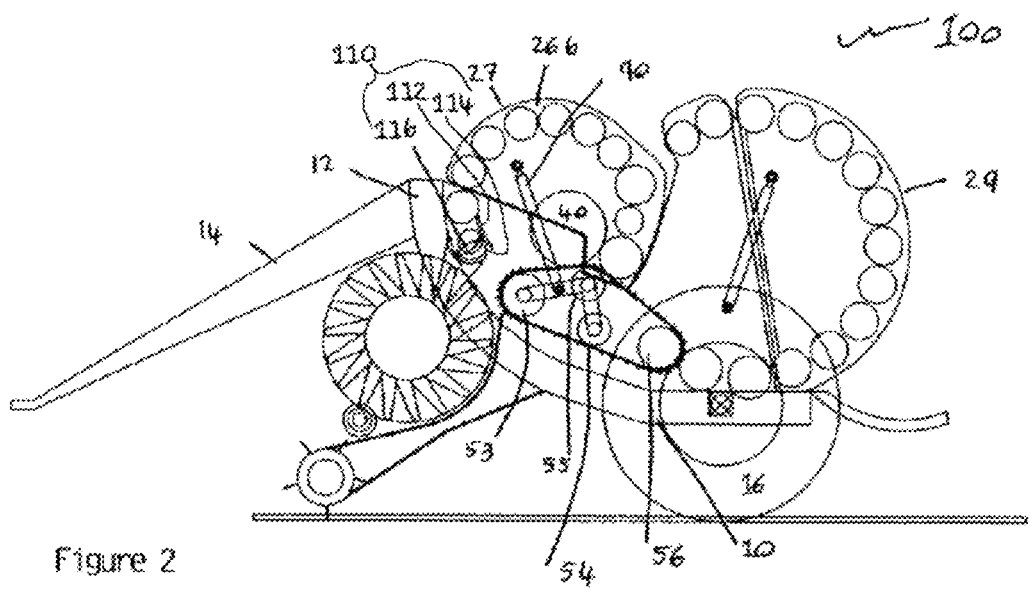
FIG. 2 is a cross-section side elevation of the bale forming apparatus of FIG. 1 with a bale beginning to form in the first bale forming chamber.
Figure 3:
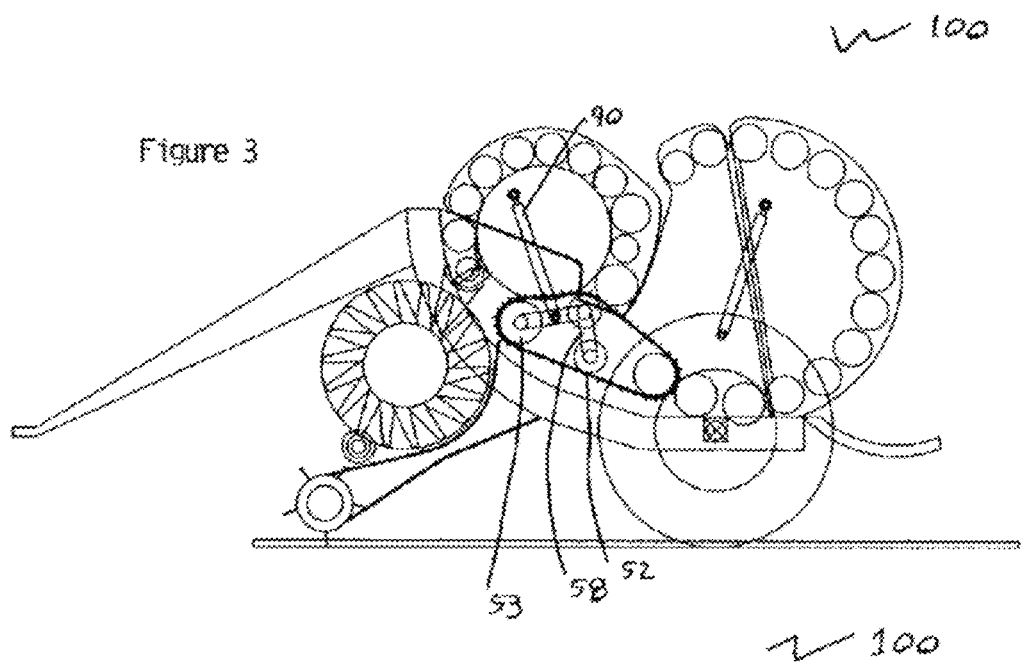
FIG. 3 is a cross-section side elevation of the bale forming apparatus of FIG. 1 with a primary bale formed in the first bale forming chamber.
Figure 4:
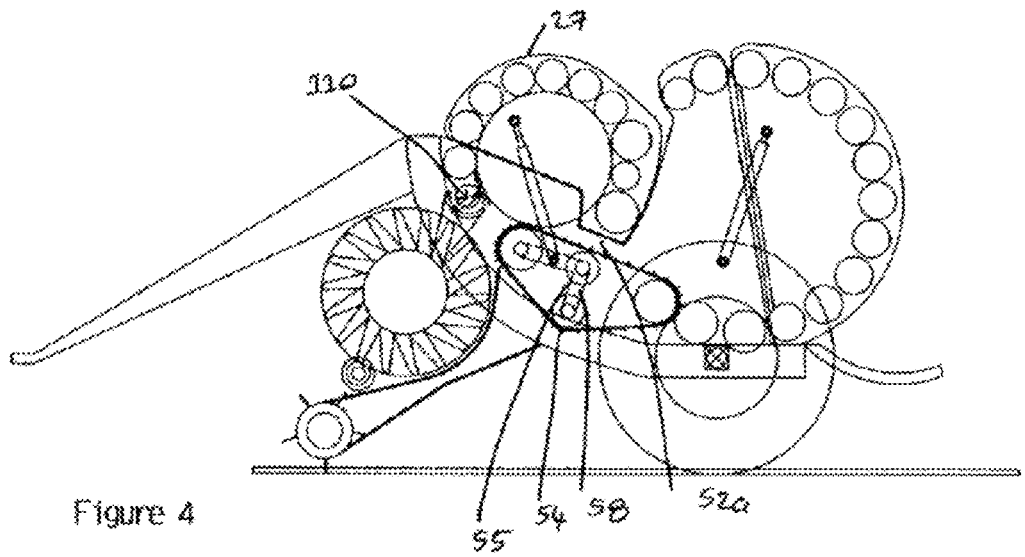
FIG. 4 is a cross-section side elevation of the bale forming apparatus of FIG. 1 showing the initiation of the transfer of the primary bale of FIG. 3 from the first bale forming chamber to the second bale forming chamber.
Figure 5:
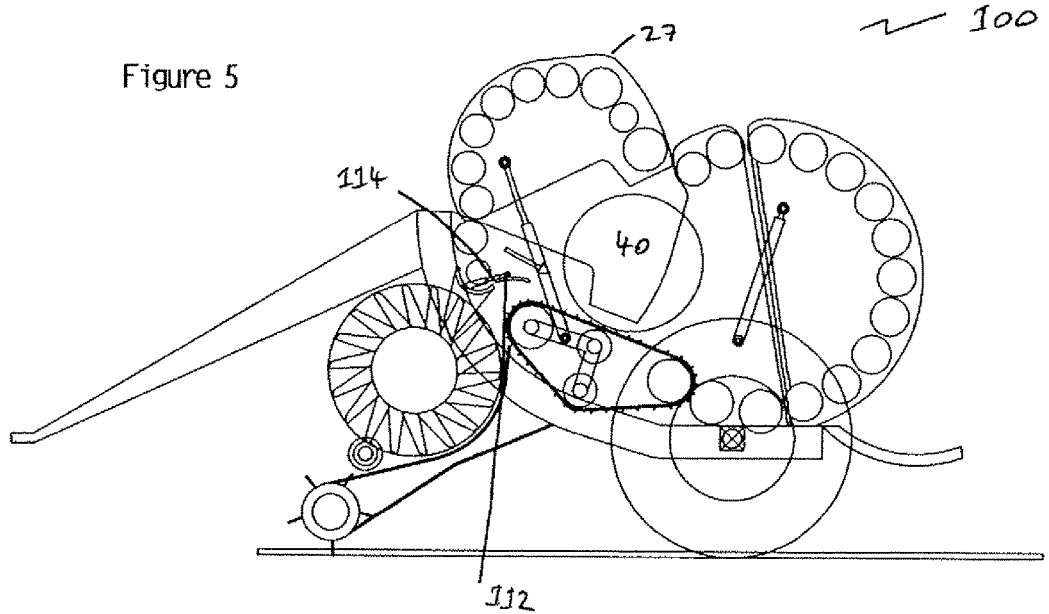
FIG. 5 is a cross-section side elevation of the bale forming apparatus of FIG. 1 showing the primary bale being transferred from the first bale forming chamber to the second bale forming chamber.
Figure 6:
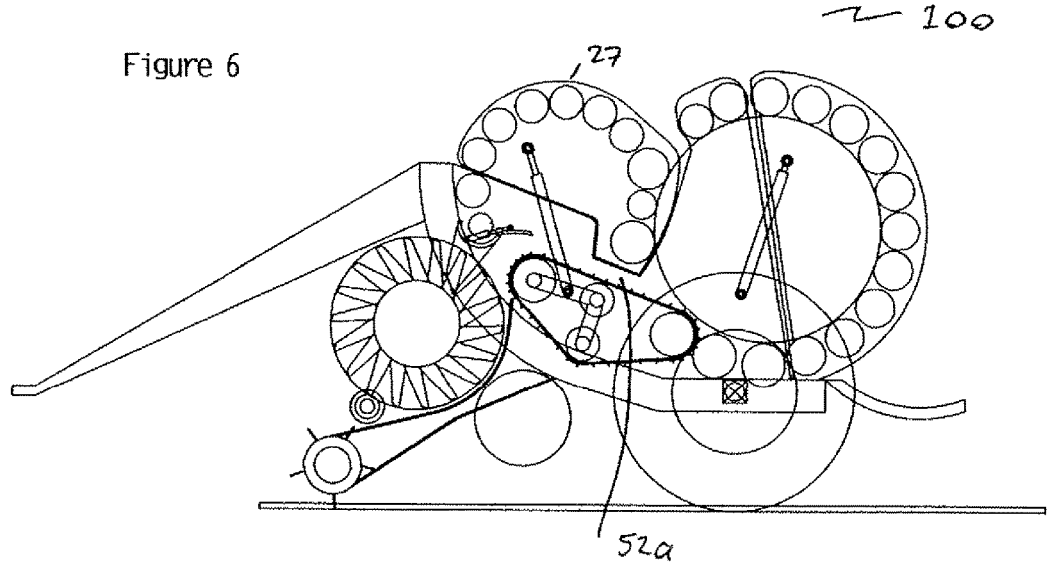
FIG. 6 is a cross-section side elevation of the bale forming apparatus of FIG. 1 showing the final bale being formed in the second bale forming chamber.
Figure 7:
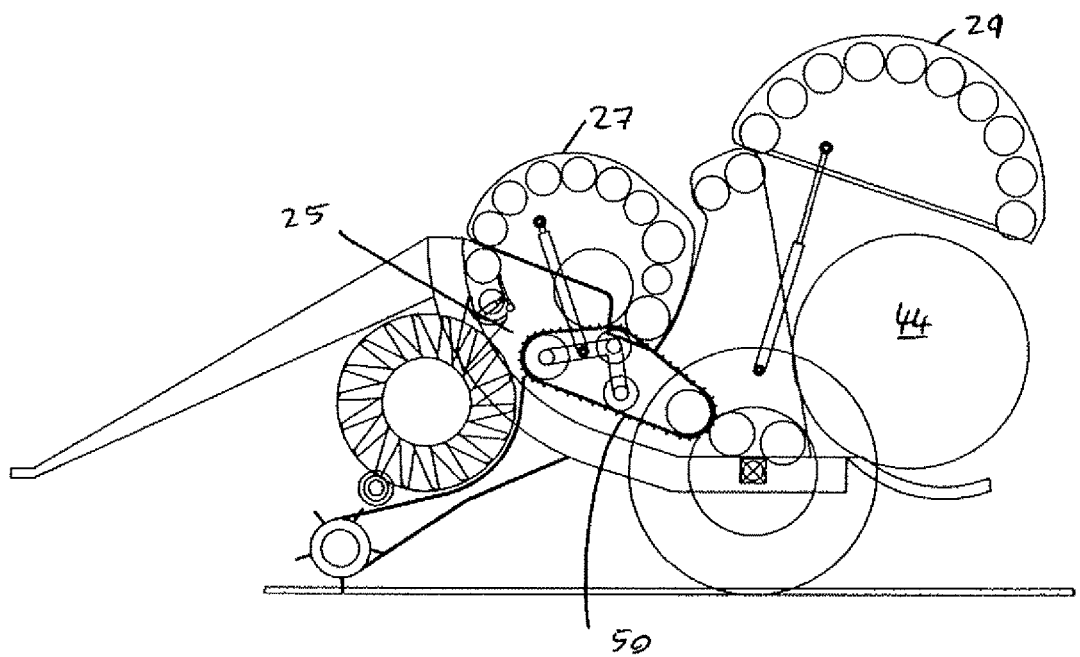
FIG. 7 is a cross-section side elevation of the bale forming apparatus of FIG. 1 showing the final bale being ejected from the second bale forming chamber.
Figure 8:
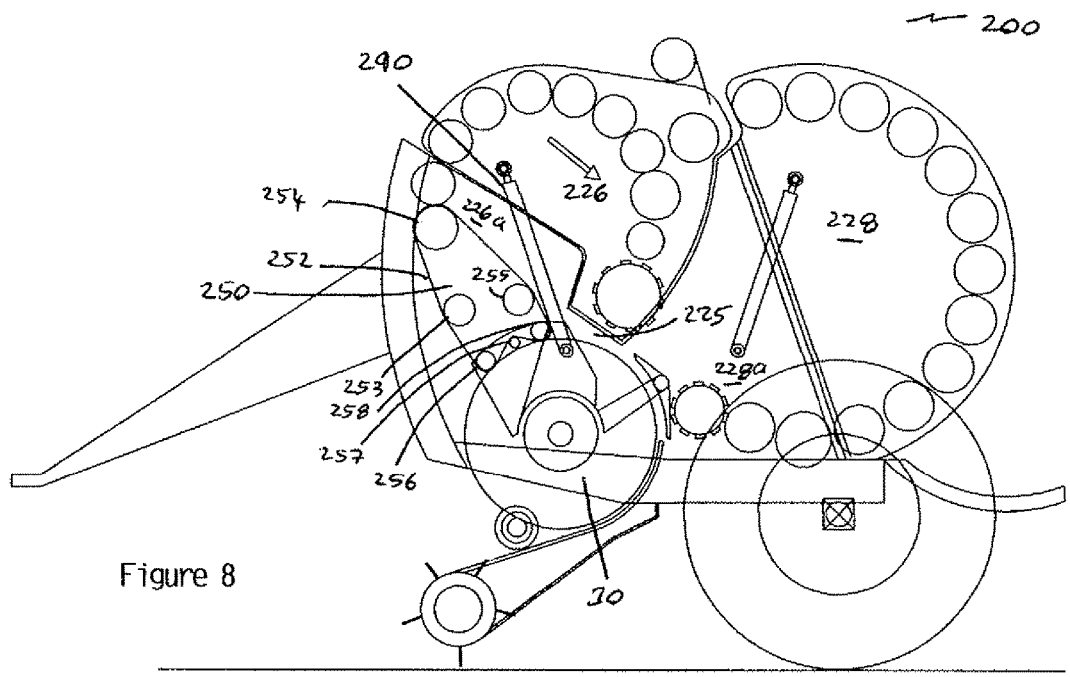
FIG. 8 is a cross-section side elevation of a second embodiment of the bale forming apparatus of the invention.

Referring now specifically to FIGS. 2 and 3, in use, the conveyor 52 and rollers 60 to 70 are activated as grass or hay is fed into the first bale forming chamber 26 via pathway 25. This causes the grass or hay to be tumbled about in the first bale forming chamber forming primary bale 40. Once the primary bale 40 reaches a required diameter and/or density as shown in FIG. 3, a sensor (not shown) is triggered which activates the drive mechanism 90. Referring now to FIGS. 4 and 5, drive mechanism 90 alters the position of rollers 53, 54 and 55 within the transfer means 50 relative to roller 70 by exerting pressure on the connecting means 58. In effect, the connecting means 58 pivots about roller 53 through an angle within a range of 20° to 30° relative to the horizontal axis and more specifically by an angle of approximately 23°±5° relative to the horizontal axis. This forces rollers 54 and 55 to move downwards such that roller 55 moves away from roller 70 thereby flattening conveyor 52 and opening a small pathway 52a between the conveyor 52 and door 27. In this way the length or distance the conveyor 52 travels about the rollers 53, 54, 55 and 56 remains the same. There is no requirement to alter the tension of the transfer mechanism 50.

Once the rollers 53, 54 and 55 have travelled the required distance the drive mechanism continues to travel forcing door 27 to open up releasing the primary bale 40 from the first chamber 26. The primary bale 40 moves into the second bale forming chamber under the influence of the transfer mechanism 50 and gravity. The conveyor 52 of the transfer mechanism 50 ensures that any stray hay or grass lost from the primary bale 40 due to the fact it is not a fully formed bale is also transferred into the second bale forming chamber 28. The speed at which the conveyor 52 operates at is determined by the user; however for optimal performance, the speed at which the conveyor 52 travels at is such that the primary bale 40 is transferred from the first bale forming chamber 26 to the second bale forming chamber 28 before the primary bale 40 unravels.

As the door 27 opens and the primary bale 40 exits the first bale forming chamber 26, a second sensor (not shown) is trigged which in turns activates directional mechanism 110. An advantage of door 27 opening to release the primary bale 40 is that a space is created between the bale 40 and opposing sides (not shown) of the baling apparatus thus freeing a path between the bale 40 and the sides of the baling apparatus. This has the effect of reducing the friction between the bale 40 and the baling apparatus allowing the bale 40 to move more easily from the first bale forming chamber 26 to the second bale forming chamber 28. Directional mechanism 110 comprises a directional plate 112 which is rotationally connected to a cylindrical member 114 and a second drive mechanism 116. It is to be understood in an alternate embodiment, directional mechanism 110 could be activated by drive mechanism 90. Accordingly, in such a configuration a second drive mechanism would not be required.

Referring briefly to FIG. 1, directional plate 112 is shown in an upright configuration. The directional plate 112 remains in this configuration whilst the preliminary bale 40 is being formed in the primary bale forming chamber 26. On activation of the directional mechanism 110, drive mechanism 116 is activated to force the directional plate 112 to rotate about the cylindrical member 114 into a second linear configuration (as shown in FIG. 5) which is substantially perpendicular to the upright configuration. The directional plate 112 in the linear configuration has the effect of directing the grass or hay being fed from the cutting mechanism 24 through the passage 25 onto the conveyor 52 which in turn feeds the grass or hay into the second bale forming chamber 28.

Once the primary bale 40 has moved into the second bale forming chamber 28 the drive mechanism 90 is activated to close door 27. The pathway 52a between the first and second bale forming chambers 26 and 28 remains open. Grass or hay are continuously fed into the second bale forming chamber 28 until a sufficient quantity of grass or hay has been fed into the chamber for a full or main bale 42 to be formed. Although not shown it is possible that roller 70 which is defined as the last roller in the roller assembly surrounding the inner peripheral surface 26b of the chamber 26 which is furthest from passage 25 is fitted with additional gripping means to facilitate movement of the primary bale 40 and grass or hay through pathway 52a into the second bale forming chamber 28.

Once the main bale 42 has reached the required diameter or density, a sensor (not shown) is triggered which activates drive mechanism 90 which then returns the rollers 53, 54 and 55 of the transfer mechanism 50 to their originating position thereby closing the pathway 52a. The same sensor also activates movement of the directional mechanism 110 such that the directional plate 112 is returned to the upright configuration. In this way the grass or hay is redirected back into the first bale forming chamber 26.

The sensor also triggers a wrapping mechanism which will then concurrently wrap the fully formed bale 42 in netting or any appropriate material as deemed suitable by a person skilled in the art. Once the fully formed bale 42 is wrapped door 29 opens and allows the wrapped fully formed bale 44 to be ejected from the second bale forming chamber 28.

Referring now to FIGS. 8 to 14, there is shown the second embodiment of the baling apparatus of the invention indicated generally by reference numeral 200.

The first bale forming chamber 226 of second embodiment of the baling apparatus 200 comprises ten rollers 271 to 280 which are arranged across the width of the chassis 10 and surrounding the inner peripheral surface 226b of the chamber 226. In a similar fashion to the first embodiment of the baling apparatus 100, the first bale forming chamber 226 is positioned such that base portion 226a of the first bale forming chamber 226 is at a higher level than the base portion 228a of the second bale forming chamber 228. The transfer mechanism 250 forms part of the base portions 226a. The first bale forming chamber 226 is provided with a door 227.

Figure 15:
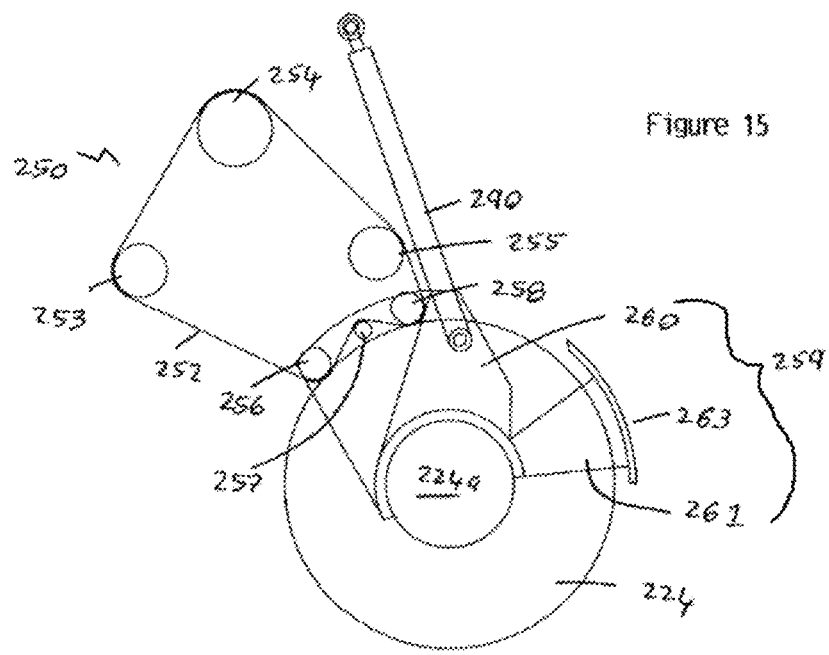
FIG. 15 is an enlarged cross-section side elevation of the hood mechanism of FIGS. 8, 9, 10, 13 and 14.
Figure 16:
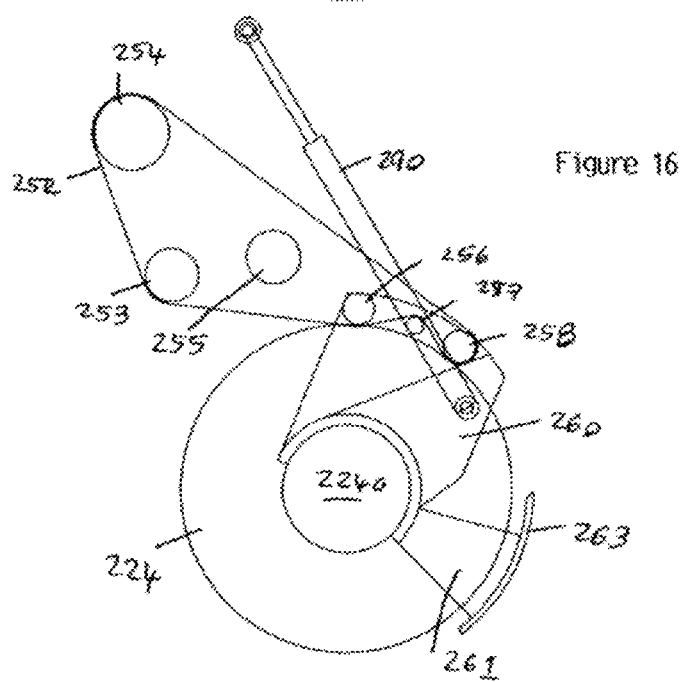
FIG. 16 is an enlarged cross-section side elevation of the hood mechanism of FIGS. 10 and 11.

Referring specifically to FIG. 15, there is shown an enlarged view of transfer mechanism 250 comprises a belt 252 arranged around a plurality of rollers 253 to 258. Rollers 256, 257 and 258 are connected to a covering means 259 which is rotatably seated over the cutting means 224. In practice the covering means 259 comprises a main arm 260 which is rotatably attached to the central axis of the cutting means 224a. In this embodiment belt 252 is wrapped around the side of roller 257 remote from the central axis 224a to prevent belt 252 from encroaching of the arc of the cutting mechanism 224.

Although not shown the interior surface of the main arm 260 is optionally provided with a number of cleaning fingers which act to clean the cutting means 224 whilst rotating through the covering means 259. Covering means 259 further comprises a secondary arm 261 which is positioned substantially at right angles to the main arm 260. The orientation of the secondary arm 261 is fixed relative to the main arm 260. The secondary arm 261 is provided with a directional plate 263. In the embodiment shown directional plate 263 is configured into an arc which is designed to correspond to the arc of the cutting means 224. It is to be understood that the directional plate 263 can be of any suitable configuration known to a person skilled in the art.

The covering means 259 is further connected to drive mechanism 290 which is operable to move the position of the covering means 259. The drive mechanism 290 is shown as a hydraulic ram which is connected to covering means 259 at one end and to the door 227 of the first bale forming chamber 226. In a first position, the directional plate 263 is orientated to direct the flow of grass or hay into the first bale forming chamber 226 via passage 225.

Figure 9:
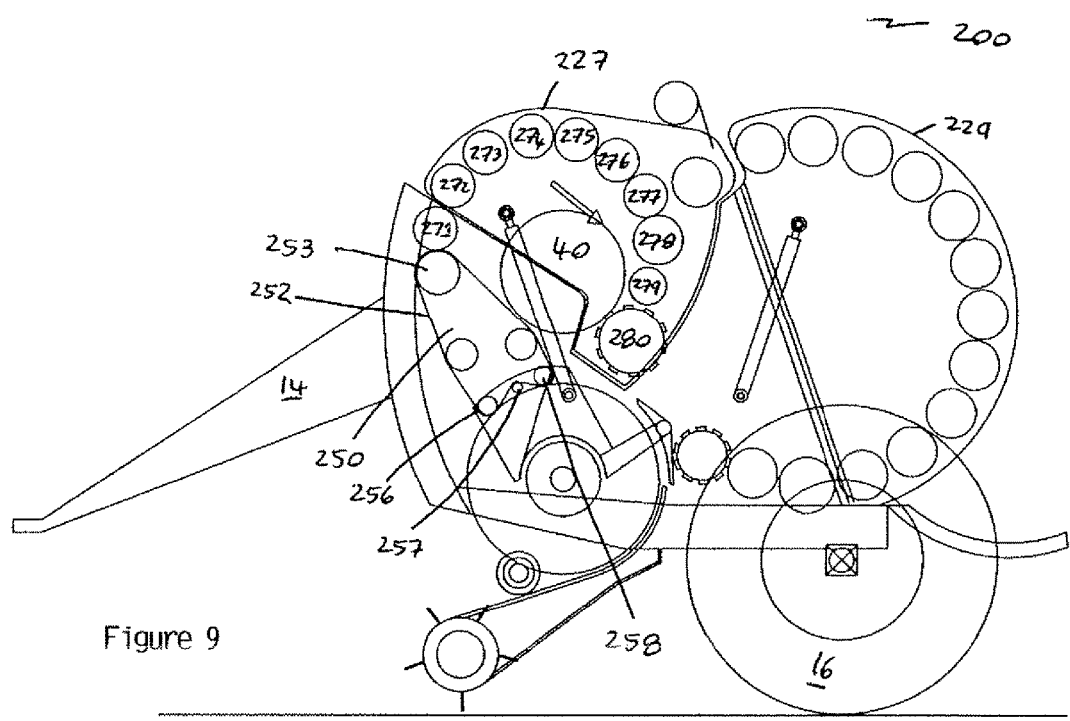
FIG. 9 is a cross-section side elevation of the bale forming apparatus of FIG. 8 with a bale beginning to form in the first bale forming chamber.
Figure 10:
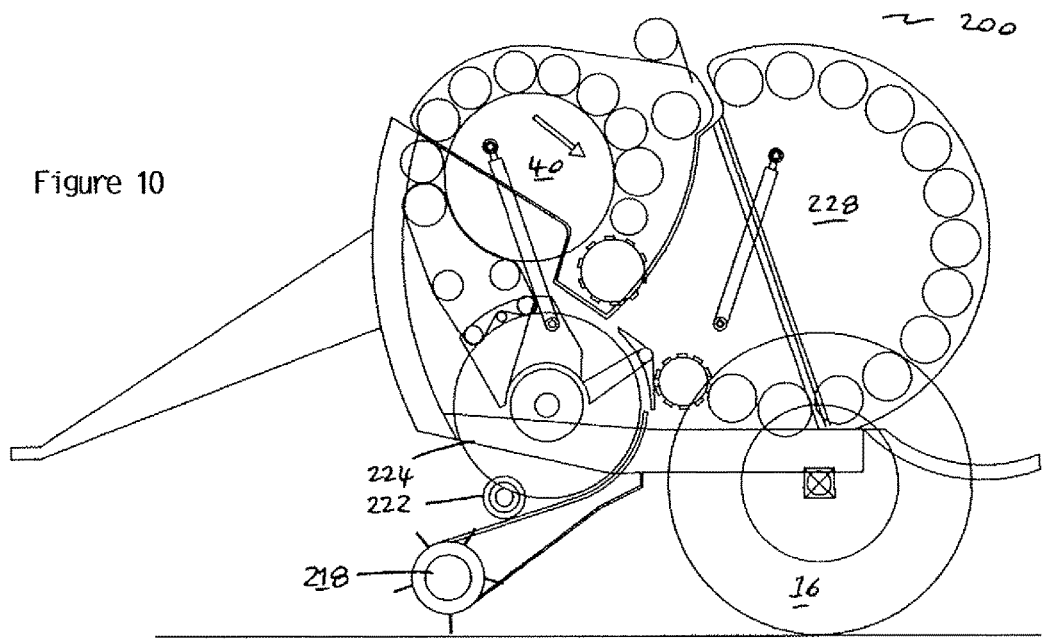
FIG. 10 is a cross-section side elevation of the bale forming apparatus of FIG. 8 with a primary bale formed in the first bale forming chamber.

Referring now specifically to FIGS. 9 and 10, as the grass or hay is tumbled about in the first bale forming chamber, belt 252 is tensioned to adapt to the shape of the primary bale 40 as it is being formed. Once the primary bale 40 reaches a required diameter and/or density as shown in FIG. 10, a sensor (not shown) is triggered which activates the drive mechanism 290. The drive mechanism 290 alters the position of the transfer mechanism 250 by forcing covering means 259 into a second position (shown more clearly in FIG. 16). Belt 252 disengages with roller 255 as the tension increases thereby flattening the belt such that belt 252 no longer holds the shape of the primary bale 40. Furthermore due to the relative positions of the rollers 253 to 258 the belt 252 is angled relative to the horizontal axis to facilitate movement of the bale 40 from the first bale forming chamber 226 into the second bale forming chamber 248. Directional plate 263 is also moved into a position whereby the crop product, e.g. hay or grasses, are now directed into the second bale forming chamber 228.

Figure 11:
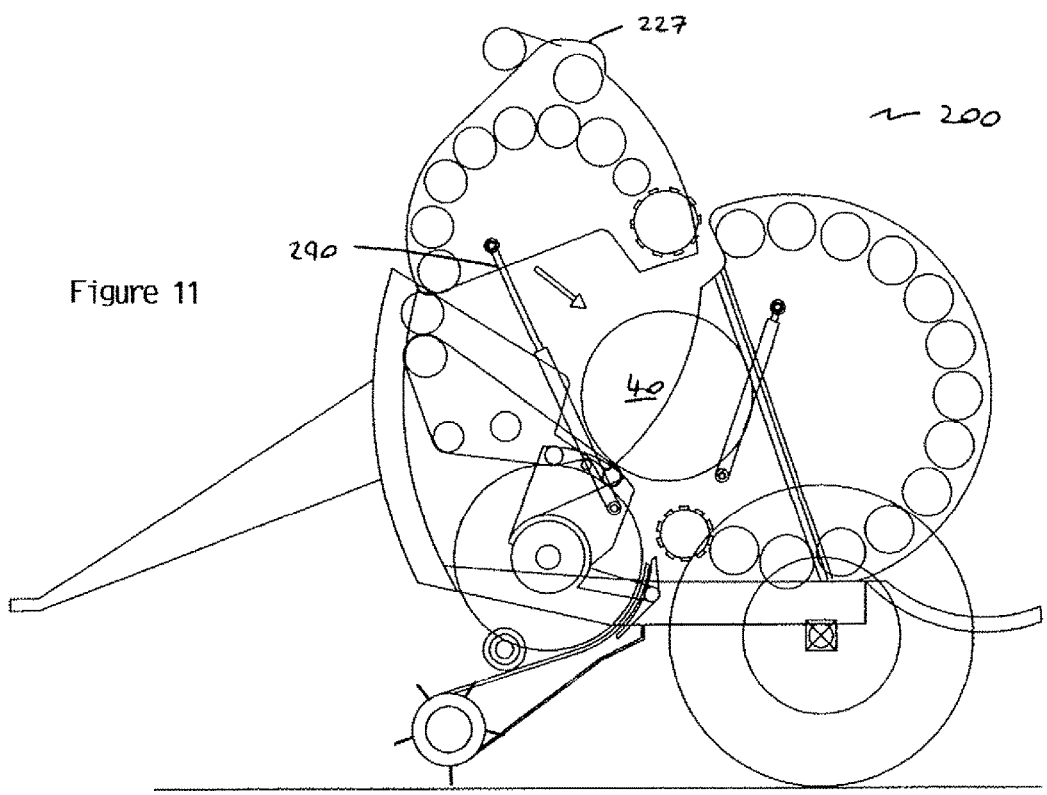
FIG. 11 is a cross-section side elevation of the bale forming apparatus of FIG. 8 showing the transfer of the primary bale of FIG. 10 from the first bale forming chamber to the second bale forming chamber.

Referring now to FIG. 11, once the covering means 259 has been moved into the second position, the drive mechanism continues to travel forcing door 227 to open up releasing the primary bale 40 from the first chamber 226. The primary bale 40 moves into the second bale forming chamber 228 under the influence of the transfer mechanism 250 as well as gravity due to the height differential between the first bale forming chamber 226 and the second bale forming chamber 228.

In a similar manner to the first embodiment, the belt 252 of the transfer mechanism 250 ensures that any stray hay or grass lost from the primary bale 40 due to the fact it is not a fully formed bale is also transferred into the second bale forming chamber 228.

Figure 12:
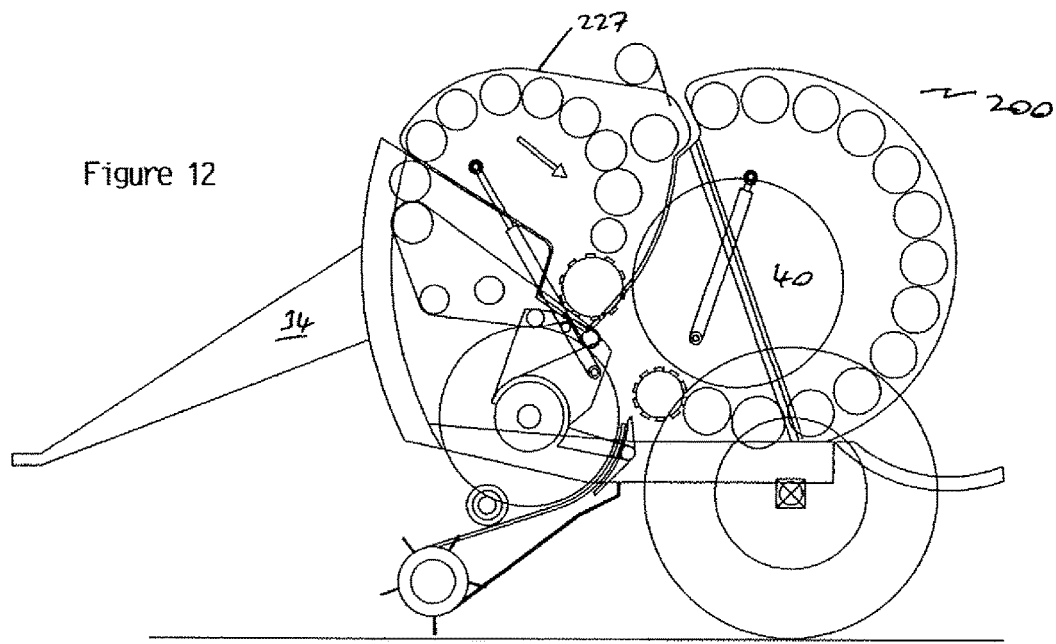
FIG. 12 is a cross-section side elevation of the bale forming apparatus of FIG. 8 showing the primary bale after being transferred from the first bale forming chamber to the second bale forming chamber.

Referring now to FIG. 12, once the primary bale 40 has moved into the second bale forming chamber 228 the drive mechanism 290 is activated to close door 227. The covering means 259 remains in the second position. In this way grass or hay are continuously fed into the second bale forming chamber 228 until a sufficient quantity of grass or hay has been fed into the chamber for a full or main bale 42 to be formed. Roller 280 is fitted with additional gripping means to facilitate movement of the primary bale 40 and grass or hay into the second bale forming chamber 228.

Figure 13:
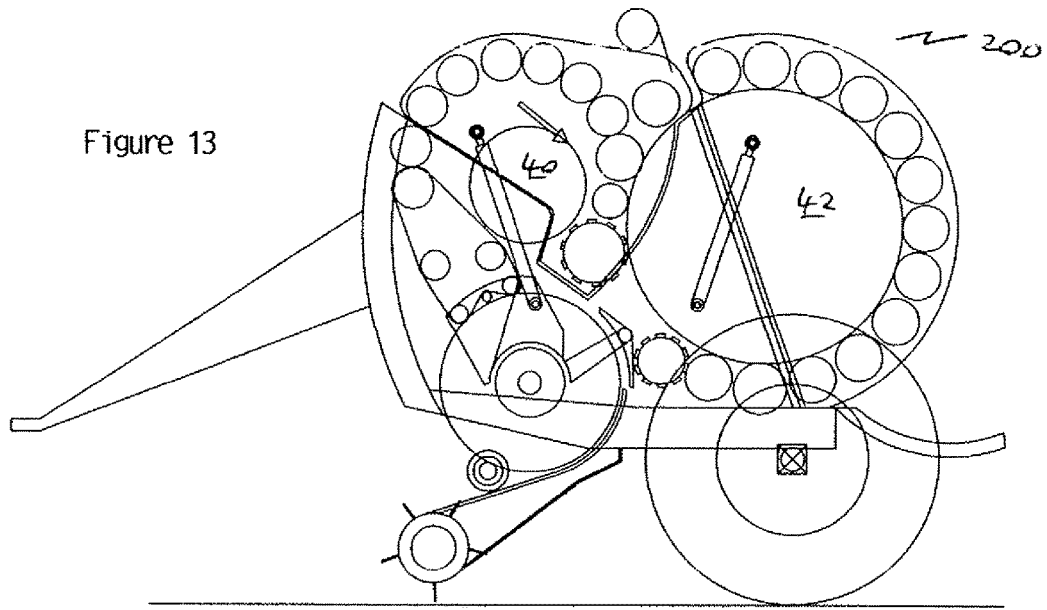
FIG. 13 is a cross-section side elevation of the bale forming apparatus of FIG. 8 showing the final bale being wrapped in the second bale forming chamber and a new primary bale beginning to form in the first bale forming chamber.

Referring now to FIG. 13, in a similar way to the first embodiment, once the main bale 42 has reached the required diameter or density, a sensor (not shown) is triggered which activates drive mechanism 290, this then returns covering means 259 of the transfer mechanism 50 to the originating or first position thereby redirecting grass or hay into the first bale forming chamber 226.

Figure 14:
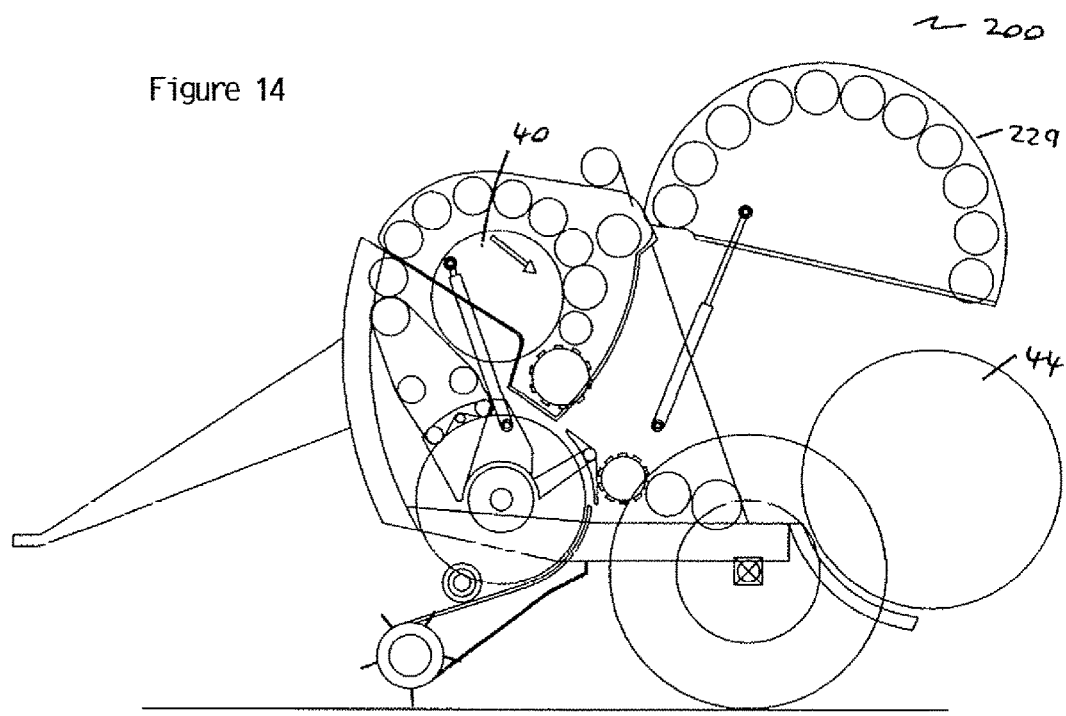
FIG. 14 is a cross-section side elevation of the bale forming apparatus of FIG. 8 showing the final bale being ejected from the second bale forming chamber whilst the new primary bale is being formed in the first bale forming chamber.

The sensor also triggers a wrapping mechanism which will then concurrently wrap the fully formed bale 42 in netting or any appropriate material as deemed suitable by a person skilled in the art. Referring to FIG. 14, once the fully formed bale 42 is wrapped door 229 opens and allows the wrapped fully formed bale 44 to be ejected from the second bale forming chamber 228.

Referring now to FIGS. 17 to 25c, there is shown the third embodiment of the baling apparatus of the invention 700. This third embodiment is similar to the second embodiment 200 with the roller layout being the primary difference between the second and third embodiments.

The first bale forming chamber 771 of the third embodiment of the baling apparatus 700 also comprises of eight rollers 706 to 713 which are arranged across the width of the chassis 761 and surrounding the inner peripheral surface 771a of the chamber 771. In the same fashion to the first and second embodiments of the baling apparatus 100 and 200 respectively, the first bale forming chamber 771 is positioned such that base portion 771a of the first bale forming chamber 771 is at a higher level than the base portion 770a of the second bale forming chamber 770. The transfer mechanism 750 forms part of the base portions 771a. The first bale forming chamber 771 is provided with a door 770a.

Referring specifically to FIGS. 24, 25, 25a, 25b and 25c, there is shown an enlarged view of transfer mechanism 750 and crop flow directional plate 783. The transfer mechanism 350 comprises a belt 780 arranged around a plurality of rollers 701 to 705. Rollers 704 and 705 are connected to a covering means 760 which is rotatably seated over the feeding and or cutting means 769. In practice, the covering means 760 comprises a main arm 792 which is rotatably attached to the central axis of the cutting means 769. In this embodiment, belt 780 is wrapped around the rollers 704 and 705 respectively. These two rollers 704 and 705 are fitted to arm 792 of the covering means 760 which in turn forms part of the transfer mechanism 750.

Although not shown, the interior surface of the main arm 792 is optionally provided with a number of cleaning fingers which act to clean the feeding and/or cutting means 769 whilst rotating through the covering means 760.

The covering means 760 is further connected to drive mechanism 732 which is operable to move the position of the covering means 760 through the pivot points 734 and 735 respectively. The drive mechanism 732 is shown as a hydraulic ram which is connected to covering means 760 and the transfer mechanism 750 at one end 734 and which is connected to the chamber door 770a through pivot point 735 at the other end of the hydraulic ram.

When the primary bale of the first bale forming chamber has formed, the position of the directional plate 263 is orientated to direct the flow of grass or hay into the second bale forming chamber 770. This will be described further in the next paragraph relating to FIGS. 25a, 25b and 25c. For the primary bale to transfer, the primary bale reaches the required diameter or density, a sensor (not shown) is triggered which activates drive mechanism which in turn rotates arm 792, cover means 760 which form part of the overall transfer mechanism 750 which rotates about the feeding and or cutting mechanisms 769 central axis. As the transfer mechanism rotates the feeding and or cutting means is covered by the cover means 760. The belt 780 which forms part of the overall transfer mechanism 750 extends as the transfer mechanism 750 rotates around the circumference of the feeding and or cutting mechanism 769. When the transfer mechanism reaches the required rotation, the drive means 732 further extends to push the chamber door 770a up to an open position to allow the primary bale to be transferred in a positive way through the combination of the transfer mechanism and the influence of gravity due to the steep incline of the transfer mechanism.

Referring now to FIGS. 25a, 25b and 25c the detail of crop flow directional means will be described in detail. As described in the previous paragraph, when the primary bale reaches the required diameter or density, a sensor (not shown) is triggered which activates the grass flow directional plate just before the activation of the transfer mechanism drive means. It will be understood that the activation of hydraulic type cylinders can be of various differing sequences depending on crop flow, machine output, feeding and or chopping mechanism design etc. As shown in FIGS. 25a, 25b and 25c, when crop flow needs to be switched to the second bale forming chamber, the drive means 785 which is attached through pivot point 784 to support arm 789 and at the other end attached through pivot point 786 to plate 787, contracts to slide the plate 787 through rollers 790, 792, 793 and 794 to the down position. When the plate 787 is in the fully down position, the drive means 785 continues to contract thereby allowing plate 787a to rotate in the downward direction, pivoting around 794 until the grass flow directional plate is in the fully down position to allow crop to flow into the second bale forming chamber. When crop needs to be directed into the first bale forming chamber, the same movements are carried out but in the opposite sequence. The drive means 785 extends upwards, due to the spring device attached to plate 787a, plate 787a will rotate first around pivot point 794 into the grass flow up position deflecting the crop into the first bale forming chamber.

When the plate 787a has rotated into the required position, plate 787 will then slide upwards through the rollers 790, 791, 793 and 794 until in the fully up position therefore ensuring the crop enters the first bale forming chamber.

It will be understood that the grass flow directional plate described here is only one specific design. This crop flow directional plate can be of varying different designs to carry out the function of alternating the grass flow between the first bale forming chamber and the second bale forming chamber.

Figure 18:
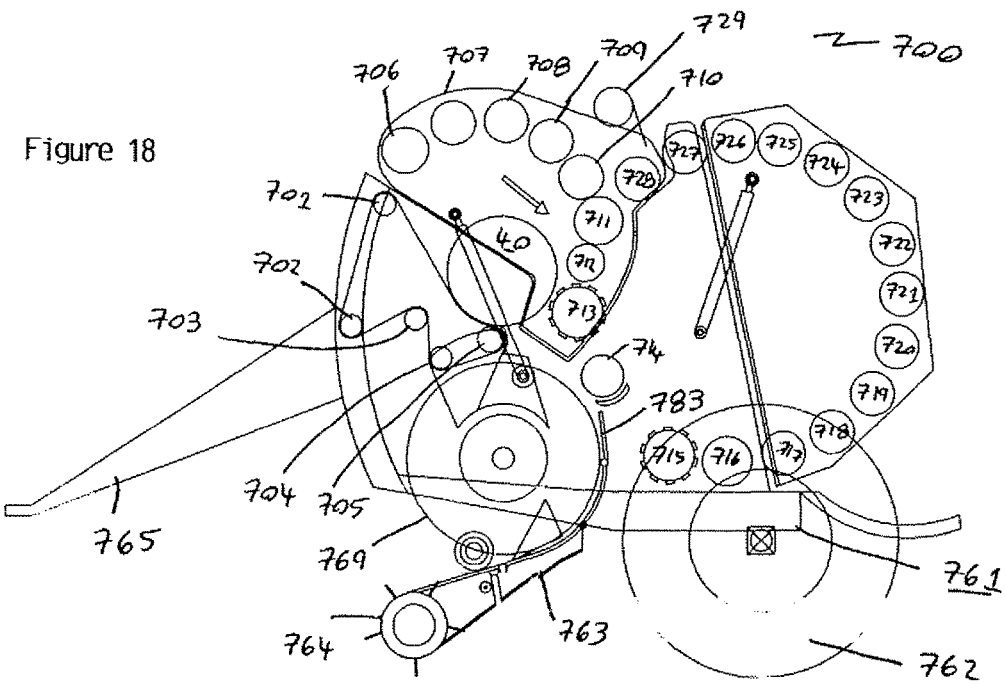
FIG. 18 is a cross-section side elevation of the bale forming apparatus of FIG. 17 with a bale beginning to form in the first bale forming chamber.
Figure 19:
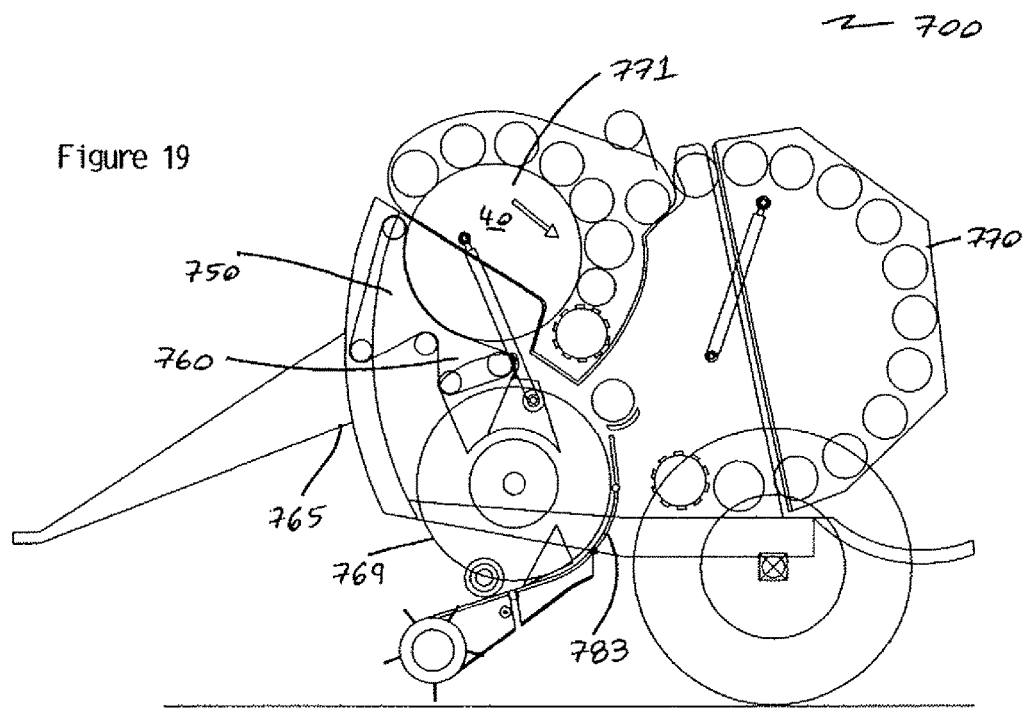
FIG. 19 is a cross-section side elevation of the bale forming apparatus of FIG. 17 with a primary bale formed in the first bale forming chamber.

Referring now specifically to FIGS. 18 and 19, as the grass or hay is tumbled about in the first bale forming chamber, belt 780 is tensioned to adapt to the shape of the primary bale 40 as it is being formed. Once the primary bale 40 reaches a required diameter and/or density as shown in FIG. 19, a sensor (not shown) is triggered which activates the drive mechanism 732. The drive mechanism 732 alters the position of the transfer mechanism 750 by forcing covering means 760 into a second position (shown more clearly in FIG. 25). Belt 780 extends with roller 705 and as the tension increases thereby flattening the belt such that belt 780 no longer holds the shape of the primary bale 40. In order to allow belt 780 to extend, it is envisaged that roller 702 will be connected by an arm (not shown) to the covering means 760. As the roller 702 is connected by an arm to the cover means 760, roller 702 will rotate along with the cover means 792, therefore allowing the belt to extend. Furthermore due to the relative positions of the rollers 701 and 705 the belt 252 is angled relative to the horizontal axis to facilitate movement of the bale 40 from the first bale forming chamber 770a into the second bale forming chamber 770. Directional plate 783 is also moved into a position whereby the hay or grasses are now directed into the second bale forming chamber 770.

Figure 20:
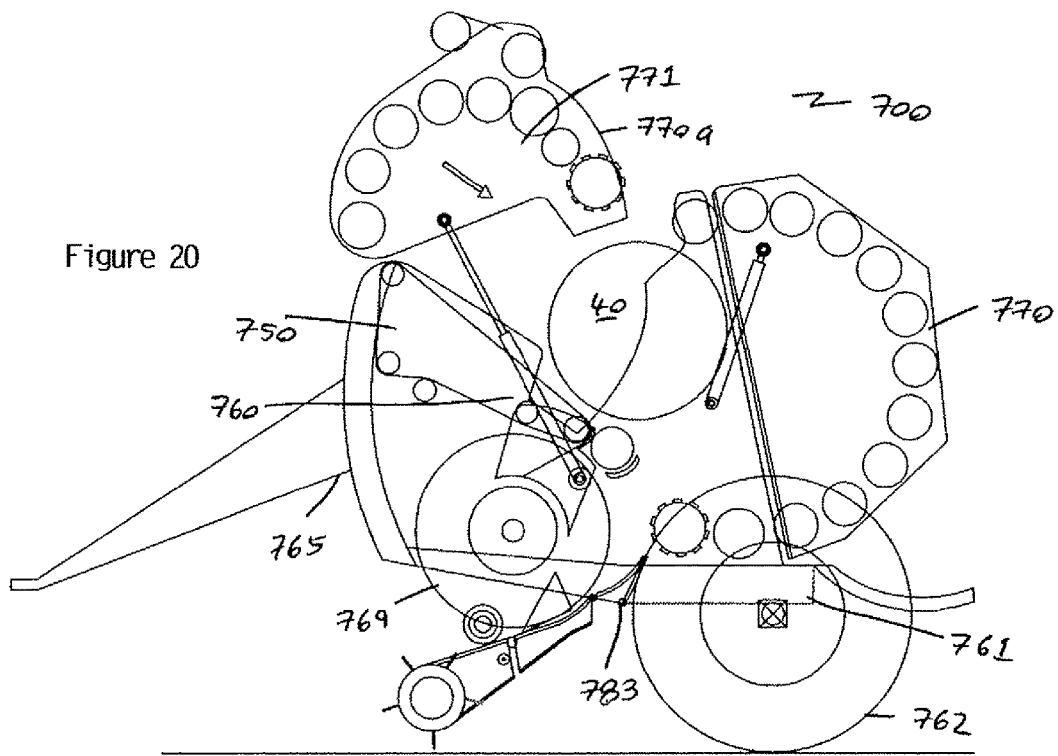
FIG. 20 is a cross-section side elevation of the bale forming apparatus of FIG. 17 showing the transfer of the primary bale of FIG. 10 from the first bale forming chamber to the second bale forming chamber.

Referring now to FIG. 20, once the covering means 760 has been moved into the second position, the drive mechanism 732 continues to travel thereby forcing door 770a to open up and releasing the primary bale 40 from the first chamber 771. The primary bale 40 moves into the second bale forming chamber 770 under positive forces from the transfer mechanism 750 and gravity.

In a similar manner to the first embodiment, the belt 780 of the transfer mechanism 750 ensures that any stray hay or grass lost from the primary bale 40 due to the fact it is not a fully formed bale is also transferred into the second bale forming chamber 770.

Figure 21:
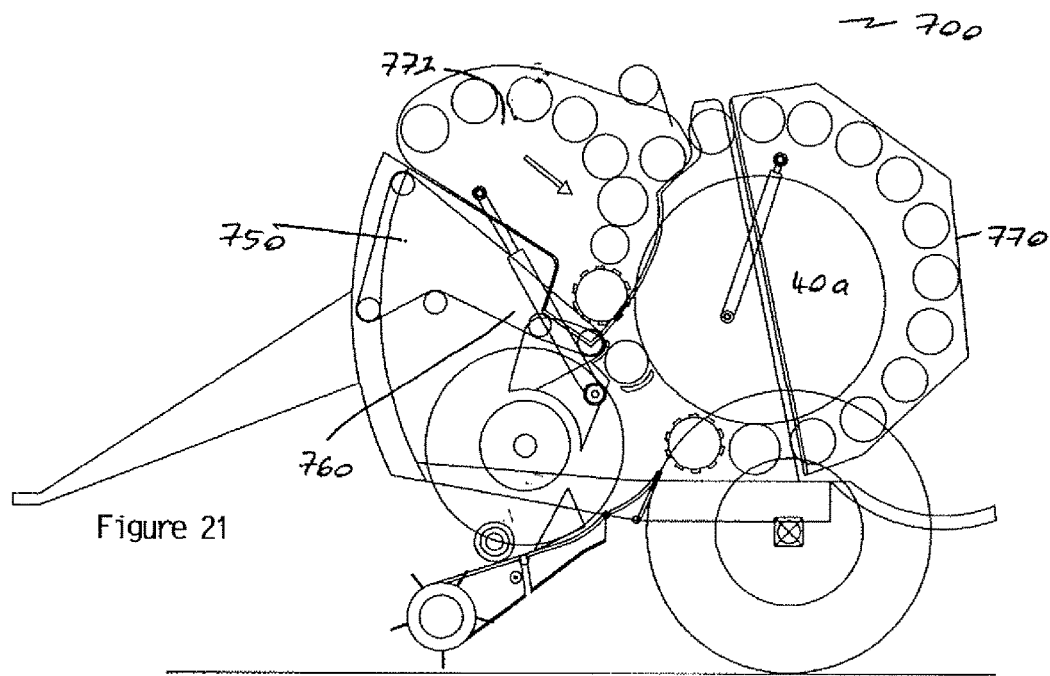
FIG. 21 is a cross-section side elevation of the bale forming apparatus of FIG. 17 showing the primary bale after being transferred from the first bale forming chamber to the second bale forming chamber.

Referring now to FIG. 21, once the primary bale 40 has moved into the second bale forming chamber 770, the drive mechanism 732 is activated to close door 771. The covering means 760 remains in the second position. In this way, grass or hay are continuously fed into the second bale forming chamber 770 until a sufficient quantity of grass or hay has been fed into the chamber for a full or main bale 42 to be formed.

Figure 22:
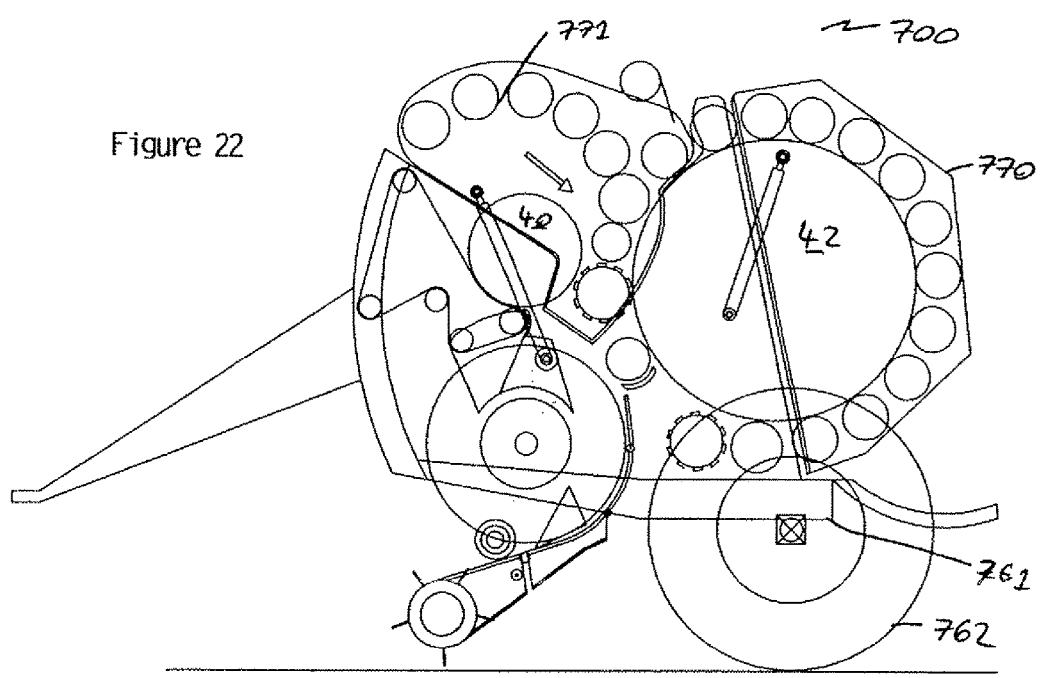
FIG. 22 is a cross-section side elevation of the bale forming apparatus of FIG. 17 showing the final bale being wrapped in the second bale forming chamber and a new primary bale beginning to form in the first bale forming chamber.

Referring now to FIG. 22, in a similar way to the first embodiment, once the main bale 42 has reached the required diameter or density, a sensor (not shown) is triggered which activates drive mechanism 732, this then returns covering means 760 of the transfer mechanism 750 along with the drive means 785 of the grass flow directional plate 783 to the originating or first position thereby redirecting grass or hay into the first bale forming chamber 771.

Figure 23:
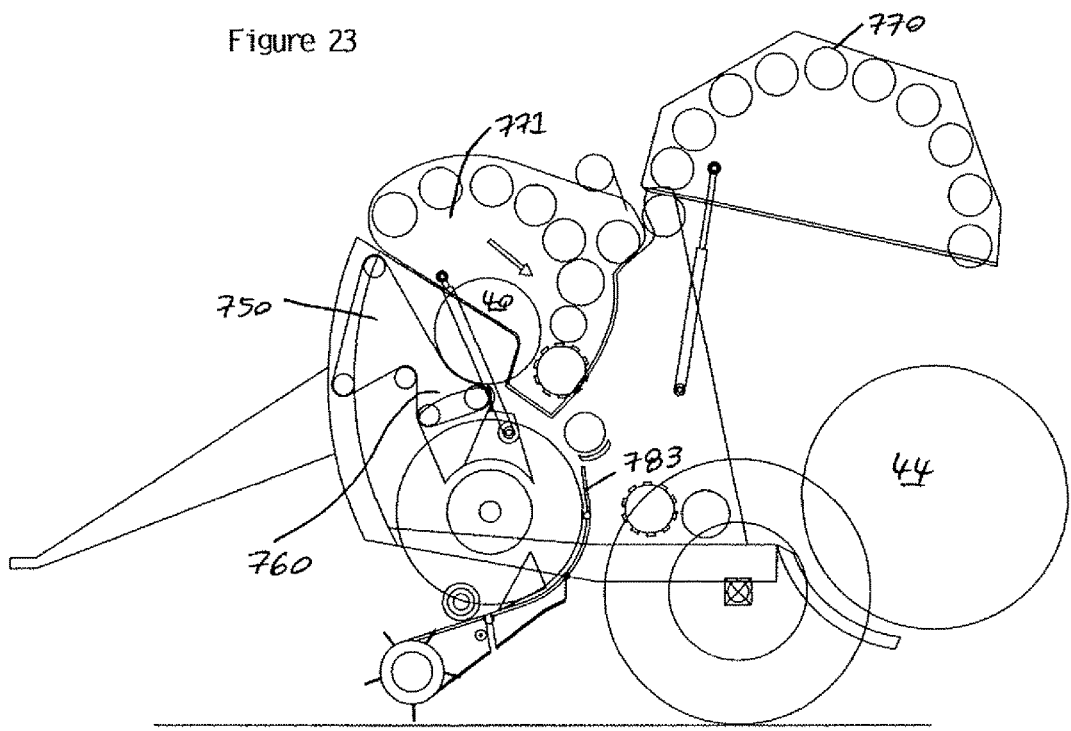
FIG. 23 is a cross-section side elevation of the bale forming apparatus of FIG. 17 showing the final bale being ejected from the second bale forming chamber whilst the new primary bale is being formed in the first bale forming chamber.
Figure 24:
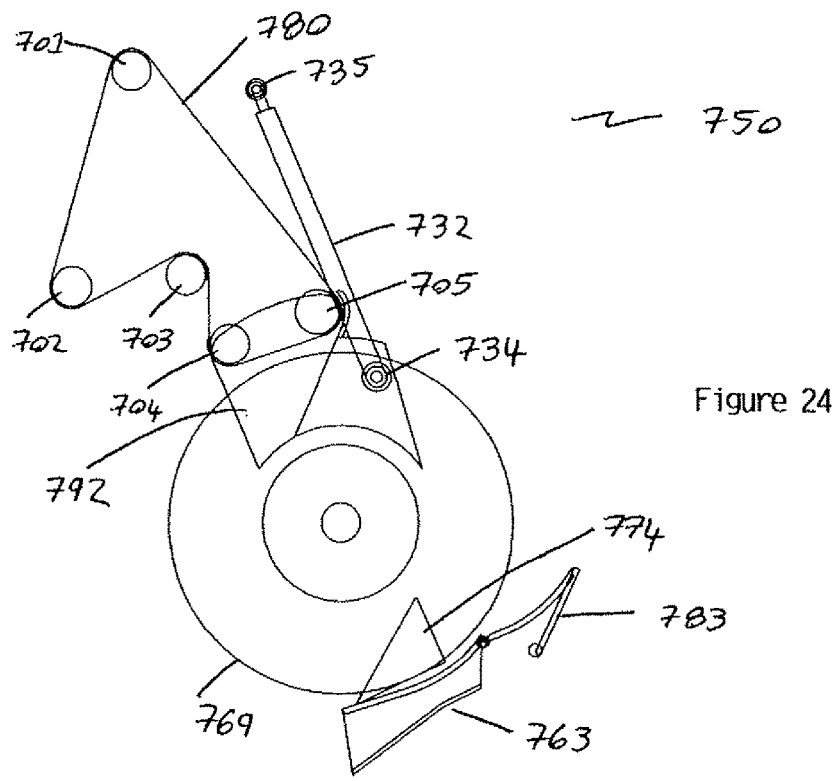
FIG. 24 is an enlarged cross-section side elevation of the hood mechanism of FIGS. 17, 18, 19, 22 and 23.

The sensor also triggers a wrapping mechanism which will then concurrently wrap the fully formed bale 42 in netting or any appropriate material as deemed suitable by a person skilled in the art. Referring to FIG. 23, once the fully formed bale 42 is wrapped, door 770 opens and allows the wrapped fully formed bale 44 to be ejected from the second bale forming chamber 228.

Referring now to FIGS. 26 to 33, there is shown a fourth embodiment of the baling apparatus of the invention indicated generally by reference numeral 800. This fourth embodiment mirrors the second and third embodiments, 200 and 700 respectively.

Each of the stages of bale formation and sequencing reflect the previous embodiments. The transfer mechanism in this embodiment of the baling apparatus 800 comprises a bottom tray of rollers 890 connected to a structure connected back to the central axis of the feeding and or cutting means 870. The tray of rollers 890 consists of four rollers 820 to 824. The top half of the primary chamber consists of eight rollers, 825, 826, 827, 828, 829, 840, 841 and 842. Roller 843 forms part of the second bale forming chamber and also forms part of the crop flow pathway 899 to the first bale forming chamber. The first bale forming chamber and second bale forming chamber have the three rollers 840, 841 and 842 in common. The second bale forming chamber consists of 18 rollers labelled 840 to 844, and 855 to 866.

Referring now to FIG. 29 the transfer sequence of the primary bale to the second bale forming chamber will be described. Drive means 815 through pivot point 814 first rotates the cover means 885 over the feeding and/or cutting mechanism. When the cover means has rotated the predefined amount, through the drive means and pivot point 813, the primary chamber door 831 opens to clear the pathway (chambers side walls and dividing rollers) to the second bale forming chamber. As the bale path is cleared for the bale to move to the second bale forming chamber, the bottom tray of rollers 890 through the pivot points 811 and 812, the drive means 810 extends to rotate the rollers 820 to 824 in the roller tray 890 to use a pushing and rotating motion to transfer the primary bale from the first bale forming chamber into the second bale forming chamber as outlined in FIG. 30. The roller tray 890 may form part of the bottom side walls of the first bale forming chamber. In this embodiment, for the purpose of demonstrating the operation of the transferring sequence, the roller tray 890 is separate and moves independently of the side walls of the first bale forming chamber.

The transfer sequence is completed by roller tray 890 rotating in the down position while the first bale forming chamber door 831 close back down to close the first bale forming chamber from the second bale forming chamber to allow the primary bale to proceed to the finished bale diameter 42. FIG. 32 shows a netting type material being applied the finished bale 42 and a new primary bale being started in the first bale forming chamber. FIG. 33 shows the finished bale 44 being ejected from the second bale forming chamber.

Referring now to FIGS. 34 and 35, there is shown the fifth embodiment of the baling apparatus of the invention indicated generally by reference 900. This fifth embodiment mirrors the second, third and fourth embodiments, 200, 700 and 800 respectively.

Each of the stages of bale formation and sequencing reflect the previous embodiments. From FIG. 34 it can be seen that the primary bale in the first bale forming chamber has formed and ready for the next stage of transfer to the second bale forming chamber. Again as per the previous embodiments, the upper part of the chamber 972 consists of a chamber door 911 with 8 rollers numbered 940 to 947 attached. The lower part of the chamber consists of 5 stationary rollers numbered 950 to 954. Again as per previous embodiments, roller 955 forms part of the second bale forming chamber 990 and also forms part of the crop flow pathway 931 providing a positive force to the crop passing into the first bale forming chamber.

The transfer of the bale can now be seen detailed in FIG. 35. The primary bale has reached a certain volume and or density, a sensor is triggered and this sensor in turn triggers the drive means 920. The drive means 920 then proceeds to extend and through pivot 922 rotates the cover means 925 around the central axis of the feeding and or cutting means 977 to a certain degree of rotation, the drive means 920 then proceeds to rises the chamber door through pivot point 921. The chamber door 911 rises and rotates around pivot point 915. As the door rises and pivots around point 915, the roller 940 makes contact with the primary bale and positively pushes and rotates the primary bale 40 into the second bale forming chamber. When the primary bale has entered the second bale forming chamber, the next part of the sequence begins, the chamber door 911 immediately closes back down to the closed position of FIG. 34 through the retraction of the drive means 920 and the pivoting of the chamber door 911 around pivot point 915. The primary bale 40 then grows in volume and density to a prefinished bale 42 when a net type material is applied. When the net has being applied the finished bale 44 is ejected from the second bale forming chamber 910 and the cycle repeats.

Referring now to FIG. 36, there is shown the sixth embodiment of the baling apparatus of the invention indicated generally by reference numeral 300. The sixth embodiment of the invention is provided with a transfer mechanism 350 which is similar to that of the first embodiment on the invention 100. The formation of the primary bale 40 and operation of the transfer mechanism 350 and door 327 in the sixth embodiment 300 of the invention are the same as that of the first embodiment 100.

The sixth embodiment 300 of the invention, the roller assembly is provided with one or more moveable rollers identified in FIG. 17 as 361*a*. Roller 361*a* is operable to push the primary bale 40 from the first bale forming chamber 326 thereby ensuring that the primary bale 40 is transferred from the first chamber 326 to the second bale forming chamber 328.

In use, the moveable roller 361*a* is seated at the inner peripheral surface 326*b* of the chamber 326. As drive mechanism 390 is operated to open door 327, the moveable roller(s) 361*a* are pushed from the inner peripheral surface 326*b* of the chamber thereby engaging with the partially formed bale 40.

As door 327 pivots open the moveable roller(s) 361*a* continue to be pushed away from the inner peripheral surface 326*b* of the chamber thereby forcing the partially formed bale 40 onto the conveyor 352 of the transfer mechanism 350 and towards the second bale forming chamber 328. In this way, the bale 40 is both carried by the conveyor 352 and pushed by the moveable roller(s) 361*a* into the second bale forming chamber 328. Once the partially formed bale 40 moves into the second bale forming chamber 328, door 327 closes. The moveable rollers 361*a* are moved back to the original position as door 327 closes.

As for the first embodiment 100, in the third embodiment the transfer mechanism does not alter position at this stage. Grass or hay continues to be fed into the second bale forming chamber 328 until the main bale is formed. Once the main bale 42 has reached the required density the sensor mechanism is triggered which initiates wrapping of the bale 42 together with movement of the transfer mechanism to redirect the grass or hay into the first bale forming chamber to begin the process again.

A Variable Diameter Belt System:

Referring now to FIGS. 37 to 43, there is shown a seventh embodiment of the baling apparatus of the invention indicated generally by reference numeral 400.

This embodiment of the invention has two positively driven belts or bands 425 and 428, each of which is arranged around a plurality of pulleys or rollers. The first belt 425 partially defines the first bale forming chamber 426 whilst the second belt 427 partially defines the second bale forming chamber 428. The pulley or roller arrangement within each of the belts comprises a mixture of fixed static rollers and moveable rollers. This specific arrangement for each is dependent on the tensioning requirements of the belts 425 and 428.

Similarly to the first and sixth embodiments of the invention the transfer mechanism 450 of the fourth embodiment comprises a conveyor 452 arranged around a plurality of rollers 453, 454, 455 and 456. Rollers 453, 454 and 455 are connected to each other by connecting means 458 such that the rollers 453, 454 and 455 are spaced apart from each other in an L shaped format. The connecting means 458 is further connected to a drive mechanism 490 which is operable to move the position of the rollers 453, 454 and 455 relative to roller 456. Connecting means 458 maintains the positions of rollers 453, 454 and 455 relative to each other. Transfer mechanism 450 is shown in FIG. 18 in an initial position wherein rollers 453 and 455 are arranged such that they are parallel to each other and are approximately in the same horizontal plane.

Referring now specifically to FIGS. 37 and 38, in use, belts 425 and 427 are activated as grass or hay is fed into the space between the transfer mechanism 450 and belt 425. This causes the grass or hay to be tumbled about in the first bale forming chamber 426 forming primary bale 40. The belt 425 deforms to accommodate the shape of the preliminary bale 40 as it grows. This is achieved by the position and movement of the rollers within the belt 425. Once the primary bale 40 reaches a required diameter and/or density as shown in FIG. 3, a sensor (not shown) is triggered which activates the drive mechanism 90.

The first belt assembly 425 is coupled to a pair of matching circular disks 460. The circular disks 460 are seated spaced apart from each other on opposing side walls of the baling apparatus 400. The circular disks are connected to each other by means of at least one transverse bar 461 arranged across the width of the chassis 10 of the baling apparatus. The circular disks 460 are rotated in tandem with each other by means of a drive mechanism (not shown). Referring now to FIG. 39, the circular disk 460 engages with the partially formed bale 40. This initially stops the partially formed bale 40 from moving along the conveyor 452 of the transfer mechanism 450 and allows the bale 40 to gather more material. The bale density is monitored such that when the bale reaches a preset amount a sensor is triggered which causes the circular disk 460 to activate. The parameters which trigger the sensor are when the bale is approximately half the size of the finished or main bale 42, which is estimated to be approximately 800 mm in diameter or contain approximately 35 to 50% of the final volume of the bale, a sensor is triggered which activates the circular disk 460. As the circular disk 460 rotates in an anticlockwise direction the partially formed bale 40 begins to travel forward towards the second belt assembly 427. At the point where the circular disk has rotated by approximately 90° or 25% of the rotational journey the drive mechanism 490 is triggered which lowers the transfer mechanism 450 into a flattened position as described previously in relation to the first embodiment of the invention. Concurrently circular disk 460 continues to rotate in an anticlockwise direction thereby continuing to move the partially formed bale 40 from the first chamber 426 into the second chamber 428. The circular disk as a number of points of contact 461, 462 and 463 on the preliminary bale 40 which keeps the unwrapped bale spinning as it is being moved from the first bale forming chamber 426 to the second bale forming chamber 428. The movement of the preliminary bale 40 by the circular disk and conveyor 452 is shown in FIGS. 39 and 40.

Referring now to FIGS. 39 and 40, the circular disk 460 continues to rotate and push the preliminary bale into the second bale forming chamber 428 and into engagement with the second belt assembly 427. The circular disk 460 maintains this position until the primary bale 40 has grown to the required size. During the transference of the bale from the first to the second bale forming chamber 426 and 428, grass or hay is continually fed into the bale 40 which is continuously rotated thus growing as the bale 40 moves from the first to the second bale forming chamber 426 and 428 respectively.

Once the primary bale 40 has moved into the second bale forming chamber 428 grasses or hay is continuously fed into the second bale forming chamber 428 until a sufficient quantity of grass or hay has been fed into the chamber for a full or main bale 42 to be formed. Once the main bale 42 has reached the required diameter or density, a sensor (not shown) is triggered which activates drive mechanism 490 which then returns the rollers 453, 454 and 455 of the transfer mechanism 450 to their originating position thereby closing the opening which allowed the grass or hay to feed into the second bale forming chamber 428.

The sensor also triggers a wrapping mechanism 490 which then wraps the fully formed bale 42 in netting or any appropriate material as deemed suitable by a person skilled in the art. Once the fully formed bale 42 is wrapped door 429 opens and allows the wrapped fully formed bale 44 to be ejected from the second bale forming chamber 428.

Referring now to FIGS. 44 to 50, there is shown an eighth embodiment 500 of the baling apparatus of the invention. The eighth embodiment of the invention combines the transfer mechanism 550 described above in relation to the second and third embodiment with a first and second belt assembly 525 and 527 as described above in relation to the seventh embodiment.

Referring finally to FIG. 51, there is shown a ninth embodiment of the baling apparatus of the invention indicated generally by reference numeral 600. The baling apparatus 600 in the ninth embodiment of the invention combines the transfer mechanism 650 described above in relation to the second and third embodiment with a first belt assembly 625 as described above in relation to the eight embodiment in the first bale forming chamber 626 and a roller mechanism as described above in relation to the first embodiment in the second bale forming chamber 628.

It will of course be understood that the invention is not limited to the specific details described herein, which are given by way of example only, and that various modifications and alterations are possible within the scope of the invention as defined in the appended Claims.

The invention claimed is:

1. A round bale forming apparatus, comprising:
a first bale forming chamber and a second bale forming chamber, the second bale forming chamber being positioned rearwardly of the first bale forming chamber, each of the first and second bale forming chambers comprising means for forming a bale from a crop product;
a cutting mechanism configured to feed the crop product into the bale forming apparatus in order to form the bale from the crop product;
a transfer mechanism configured to transfer a partially formed bale from the first bale forming chamber into the second bale forming chamber, the transfer mechanism being attached to a central axis of the cutting mechanism and located between the first bale forming chamber and the second bale forming chamber; and
a directional mechanism configured to direct the crop product from the cutting mechanism selectively into one of the first bale forming chamber and the second bale forming chamber such that the partially formed bale is formable in the first bale forming chamber and a fully formed bale is formable in the second bale forming chamber,
wherein the transfer mechanism is pivotably moveable around the central axis of the cutting mechanism to provide a cover over the cutting mechanism for transfer of the partially formed bale.

2. The round bale forming apparatus as claimed in claim 1 wherein the transfer mechanism is connected to the directional mechanism and is operable to alter a pathway of the crop product being fed into the round bale forming apparatus such that when the partially formed bale in the first bale forming chamber reaches at least one of a pre-determined diameter and density, and is transferred to the second bale forming chamber, the pathway of the crop product incoming into the round bale forming apparatus is directed into the second bale forming chamber.

3. The round bale forming apparatus as claimed in claim 1 wherein the transfer mechanism forms at least part of a base of the first bale forming chamber.

4. The round bale forming apparatus as claimed in claim 3 wherein the transfer mechanism is connected to the directional mechanism and is operable to alter a pathway of the crop product being fed into the round bale forming apparatus such that when the partially formed bale in the first bale forming chamber reaches at least one of a pre-determined diameter and density and is transferred to the second bale forming chamber, the pathway of the crop product incoming into the round bale forming apparatus is directed into the second bale forming chamber.

5. The round bale forming apparatus as claimed in claim 1 wherein the first bale forming chamber is provided with a door.

6. The round bale forming apparatus as claimed in claim 5 wherein the door of the first bale forming chamber is moveably connected to a drive mechanism which operates the transfer mechanism whereby when the door of the first bale forming apparatus opens, the partially formed bale exits from the first bale forming chamber.

7. The round bale forming apparatus as claimed in claim 1 wherein the transfer mechanism comprises any one or more of the following group: a belt, a rotating disc, and rollers; and a pivoting chamber door is provided on the first bale forming chamber.

8. The round bale forming apparatus as claimed in claim 1 wherein the round bale forming apparatus comprises urging means for urging the bale from the first bale forming chamber to the second bale forming chamber such that frictional forces between the bale and side walls of the first bale forming chamber are substantially overcome and said frictional forces do not impede the transfer of the bale from the first bale forming chamber to the second bale forming chamber.

9. The round bale forming apparatus as claimed in claim 8 wherein the urging means for urging the bale from the first bale forming chamber to the second bale forming chamber is configured such that frictional forces between the bale and the side walls of the first bale forming chamber are substantially overcome and wherein said urging means are included in the transfer mechanism.

10. The round bale forming apparatus as claimed in claim 9 wherein the urging means comprises means for reducing a surface area of the side walls of the first bale forming chamber that are in contact with the bale in the first bale forming chamber.

11. The round bale forming apparatus as claimed in claim 8 wherein the urging means comprises means for reducing a surface area of the side walls of the first bale forming chamber that are in contact with the bale in the first bale forming chamber.

12. The round bale forming apparatus as claimed in claim 11 wherein the means for reducing the surface area of the side walls of the first bale forming chamber that are in contact with the bale in the first bale forming chamber comprises a moveable door on the first bale forming chamber with the door providing a portion of the side walls of the first bale forming chamber and the door being moveable between an open position and a closed position such that in the open position, the bale in the first bale forming chamber can move from the first bale forming chamber to the second bale forming chamber without being in contact with all of the surface area of the side walls of the first bale forming chamber.

13. The round bale forming apparatus as claimed in claim 12 wherein the first bale forming chamber comprises a guide wall for guiding the bale, whereby when the chamber door is in the open position and the bale in the first bale forming chamber is moving from the first bale forming chamber to the second bale forming chamber without being in contact with all of the surface area of the side walls of the first bale forming chamber, a guide wall portion is provided to guide the bale to the second bale forming chamber.

14. The round bale forming apparatus as claimed in claim 8 wherein the urging means comprises a disc for urging the bale from the first bale forming chamber to the second bale forming chamber.

15. The round bale forming apparatus as claimed in claim 1 wherein the transfer mechanism is attached to the central axis of the cutting mechanism via a plurality of rollers that are connected to the cover which has a main arm which is rotatably attached to the central axis of the cutting mechanism.

16. The round bale forming apparatus as claimed in claim 15 wherein the cover further comprises a secondary arm that is fixed relative to the main arm, wherein a directional plate of the directional mechanism is attached to the secondary arm.

17. The round bale forming apparatus as claimed in claim 15 wherein the cover is further connected to a drive mechanism which is operable to move a position of the cover.

18. A method of forming a round bale using a round bale forming apparatus, the method being suitable for use in the bale forming apparatus comprising a bale forming system comprising a fixed chamber roller system; or a variable diameter belt system; or a combination of a fixed chamber roller system and a variable diameter belt system, the method comprising:

(a) Using the bale forming apparatus comprising a first bale forming chamber and a second bale forming chamber; a transfer mechanism configured to transfer a partially formed bale from the first bale forming chamber into the second bale forming chamber, the transfer mechanism being attached to a central axis of a cutting mechanism and located between the first bale forming chamber and the second bale forming chamber; and a directional mechanism configured to direct a crop product from the cutting mechanism selectively into one of the first bale forming chamber and the second bale forming chamber such that the partially formed bale is formable in the first bale forming chamber and a fully formed bale is formable in the second bale forming chamber, wherein the transfer mechanism is pivotably moveable around a center of the cutting mechanism to provide a cover over at the cutting mechanism for transfer of the partially formed bale;

(b) Feeding a supply of the crop product through the cutting mechanism in to the first bale forming chamber in the bale forming apparatus;

(c) Subjecting the crop product in the first bale forming chamber to a tumbling action by a movement of the bale forming system to form the partially formed bale or primary bale in the first bale forming chamber;

(d) Continuing to supply the crop product to the first bale forming chamber until the partially formed bale reaches at least one of a pre-determined diameter and density;

(e) On reaching the at least one of the pre-determined diameter and density, the partially formed bale is transferred by the transfer mechanism to the second bale forming chamber;

(f) Concurrently with step (e), altering a pathway of the supply of crop product being fed into the bale forming apparatus such that the crop product is directed into the second bale forming chamber;

(g) Continuing to supply the crop product into the second bale forming chamber so that the bale continues to be supplied with the crop product so as to form the fully formed bale in the second bale forming chamber;

(h) Once the bale has reached at least one of a required diameter and density, triggering a sensor which causes the transfer mechanism to alter the pathway of the crop product such that it is redirected into the first bale forming chamber thereby starting the process of forming a second partially formed bale in the first bale forming chamber;

(i) simultaneously with step (h) the sensor also triggers a wrapping mechanism operable to wrap the fully formed bale; and (j) after the fully formed bale is wrapped, opening a door and allowing the wrapped fully formed bale to be ejected from the second bale forming chamber.

19. A round bale forming apparatus, comprising:

a first bale forming chamber and a second bale forming chamber, the second bale forming chamber being positioned rearwardly of the first bale forming chamber, each of the first and second bale forming chambers comprising means for forming a bale from a crop product;

a cutting mechanism configured to feed the crop product into the bale forming apparatus in order to form the bale from the crop product;

a transfer mechanism configured to transfer a partially formed bale from the first bale forming chamber into the second bale forming chamber, the transfer mechanism being attached to a central axis of the cutting mechanism and located between the first bale forming chamber and the second bale forming chamber; and a directional mechanism configured to direct the crop product from the cutting mechanism selectively into one of the first bale forming chamber and the second bale forming chamber such that the partially formed bale is formable in the first bale forming chamber and a fully formed bale is formable in the second bale forming chamber, wherein the transfer mechanism is pivotably moveable predominately around a center of the cutting mechanism to provide a cover over the cutting mechanism for transfer of the partially formed bale, wherein the transfer mechanism forms at least part of a base of the first bale forming chamber, and wherein the first bale forming chamber is provided with a door, the door being positioned between the first and second bale forming chamber.

20. A method of forming a round bale using a round bale forming apparatus, the method being suitable for use in the bale forming apparatus comprising a bale forming system comprising a fixed chamber roller system; or a variable diameter belt system; or a combination of a fixed chamber roller system and a variable diameter belt system, the method comprising:

(a) Using the bale forming apparatus comprising a first bale forming chamber and a second bale forming chamber; a transfer mechanism configured to transfer a partially formed bale from the first bale forming chamber into the second bale forming chamber, the transfer mechanism being located between the first bale forming chamber and the second bale forming chamber; a cutting mechanism; and a directional mechanism configured to direct a crop product from the cutting mechanism selectively into one of the first bale forming chamber and the second bale forming chamber such that the partially formed bale is formable in the first bale forming chamber and a fully formed bale is formable in the second bale forming chamber, wherein the transfer mechanism is pivotably moveable predominately around a center the cutting mechanism to provide a cover over the cutting mechanism for transfer of the partially formed bale, wherein the transfer mechanism forms at least part of a base of the first bale forming chamber, and wherein the first bale forming chamber is provided with a door, the door being positioned between the first and second bale forming chamber;

(b) Feeding a supply of the crop product through the cutting mechanism into the first bale forming chamber in the bale forming apparatus;

(c) Subjecting the crop product in the first bale forming chamber to a tumbling action by a movement of the bale forming system to form the partially formed bale or primary bale in the first bale forming chamber;

(d) Continuing to supply the crop product to the first bale forming chamber until the partially formed bale reaches at least one of a pre-determined diameter and density;

(e) On reaching the at least one of the pre-determined diameter and density, the partially formed bale is transferred by the transfer mechanism to the second bale forming chamber;

(f) Concurrently with step (e), altering a pathway of the supply of crop product being fed into the bale forming apparatus such that the crop product is directed into the second bale forming chamber;

(g) Continuing to supply the crop product into the second bale forming chamber so that the bale continues to be supplied with the crop product so as to form the fully formed bale in the second bale forming chamber;

(h) Once the bale has reached at least one of a required diameter and density, triggering a sensor which causes the transfer mechanism to alter the pathway of the crop product such that it is redirected into the first bale forming chamber thereby starting the process of forming a second partially formed bale in the first bale forming chamber;

(i) simultaneously with step (h) the sensor also triggers a wrapping mechanism operable to wrap the fully formed bale; and (j) after the fully formed bale is wrapped, opening the door and allowing the wrapped fully formed bale to be ejected from the second bale forming chamber.

* * * * *